(12) United States Patent
Kameyama et al.

(10) Patent No.: US 7,082,263 B2
(45) Date of Patent: Jul. 25, 2006

(54) LENS-FITTED PHOTO FILM UNIT, FLASH DEVICE, AND LENS-FITTED PHOTO FILM SYSTEM

(75) Inventors: Nobuyuki Kameyama, Minami-Ashigara (JP); Hirokazu Yokoo, Minami-Ashigara (JP); Akihisa Iida, Minami-Ashigara (JP); Takeshi Kubota, Minami-Ashigara (JP); Jun Ogawa, Minami-Ashigara (JP); Kazuo Kamata, Minami-Ashigara (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 0 days.

(21) Appl. No.: 10/973,912

(22) Filed: Oct. 27, 2004

(65) Prior Publication Data

US 2005/0058441 A1 Mar. 17, 2005

Related U.S. Application Data

(62) Division of application No. 10/396,457, filed on Mar. 26, 2003, now Pat. No. 6,839,510.

(30) Foreign Application Priority Data

| Mar. 28, 2002 | (JP) | ............................. 2002-093331 |
| Mar. 28, 2002 | (JP) | ............................. 2002-093332 |
| Mar. 28, 2002 | (JP) | ............................. 2002-093333 |

(51) Int. Cl.
*G03B 15/03* (2006.01)
*G03B 17/02* (2006.01)

(52) U.S. Cl. .......................................... 396/6; 396/198

(58) Field of Classification Search ................. 396/6, 396/176, 198

See application file for complete search history.

(56) References Cited

U.S. PATENT DOCUMENTS

| 3,783,757 | A |   | 1/1974 | Wagner et al. |
| 3,943,532 | A |   | 3/1976 | De Filippis |
| 3,969,736 | A |   | 7/1976 | Lehmann |
| 4,406,533 | A | * | 9/1983 | Yamamoto ................. 396/206 |
| 4,801,957 | A |   | 1/1989 | Vandemoere |
| 5,003,330 | A |   | 3/1991 | Kotani et al. |
| 5,079,584 | A |   | 1/1992 | Nakamura |
| 5,172,031 | A |   | 12/1992 | Matsui et al. |
| 6,044,227 | A |   | 3/2000 | Hata |
| 6,351,608 | B1 |   | 2/2002 | Constable |
| 6,466,741 | B1 | * | 10/2002 | Uchiyama ..................... 396/6 |
| 6,608,969 | B1 |   | 8/2003 | Schroder |
| 2003/0034693 | A1 |   | 2/2003 | Wareham et al. |

FOREIGN PATENT DOCUMENTS

JP 7-120883 5/1995

* cited by examiner

*Primary Examiner*—Christopher Mahoney
(74) *Attorney, Agent, or Firm*—Young & Thompson

(57) ABSTRACT

A flash device for a lens-fitted photo film unit pre-loaded with unexposed photo film is provided. A main capacitor stores charge. A flash emitter emits flash light. A flash circuit board charges the main capacitor, and drives the flash emitter by discharging the main capacitor in response to an exposing operation. A tightly closed flash case is secured to the lens-fitted photo film unit, for containing the main capacitor, the flash emitter and the flash circuit board. Also, the lens-fitted photo film unit includes a sync switch for generating a trigger signal in response to the exposing operation. Two switch contact points are disposed outside the flash case, for receiving the trigger signal from the sync switch. The two switch contact points disable discharge of the main capacitor while the flash case is away from the lens-fitted photo film unit, and are short-circuited for discharge of the main capacitor upon supply of the trigger signal while the flash case is secured to the lens-fitted photo film unit.

6 Claims, 27 Drawing Sheets

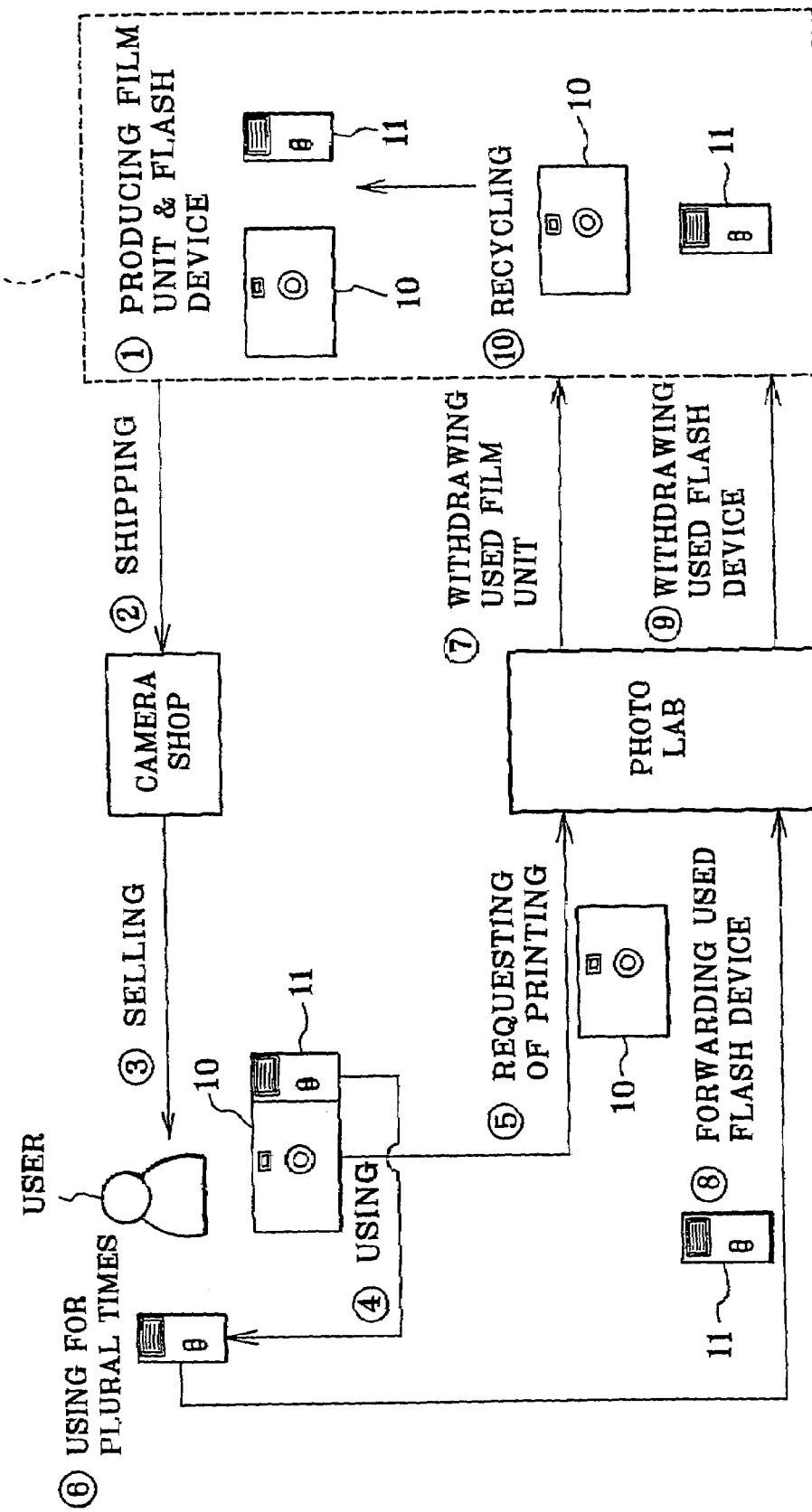

|  | WHEN FLASH DEVICE IS ATTACHED | WHEN FLASH DEVICE IS DETACHED |
|---|---|---|
| CHARGE ALLOWING SW 133 | ON | OFF |
| FORCIBLE DISCHARGING SW 134 | OFF | ON |

LENS-FITTED PHOTO FILM UNIT, FLASH DEVICE, AND LENS-FITTED PHOTO FILM SYSTEM

CROSS REFERENCE TO RELATED APPLICATIONS

This application is a division of application Ser. No. 10/396,457, filed on Mar. 26, 2003 now U.S. Pat. No. 6,839,510, the entire contents of which are hereby incorporated.

BACKGROUND OF THE INVENTION

1. Field of the Invention

The present invention relates to a lens-fitted photo film unit, flash device and lens-fitted photo film system. More particularly, the present invention relates to a lens-fitted photo film unit of which a flash device can be used repeatedly by connection with a new lens-fitted photo film unit after using the initial lens-fitted photo film unit, and a flash device, and a lens-fitted photo film system.

2. Description Related to the Prior Art

A lens-fitted photo film unit is known as a single-use camera pre-loaded with photo film. The lens-fitted photo film unit includes a main body, and front and rear covers. The main body contains photo film, and has a mechanism for taking an exposure. The front and rear covers cover the front and rear of the main body. Those relevant parts are formed from plastic material.

The lens-fitted photo film unit has typical features of a small size, a simple structure, a low cost and the like. However, there are additional structures provided in the lens-fitted photo film unit for various purposes, for example, a flash type of the lens-fitted photo film unit. The flash type has a flash device, which includes a flash emitter and a flash circuit board supplied with power by a battery.

After a user exposes all the frames on the photo film, he or she forwards a used lens-fitted photo film unit to a photo finisher or photo laboratory without disassembly, and requests printing. When photographic prints are obtained, the developed photo film is also returned to the user. A housing of the used lens-fitted photo film unit, in contrast, is collected, handled by a photo finisher, and withdrawn to a camera manufacturer.

There are suggestion of the camera manufacturer for recycling the used lens-fitted photo film unit in view of preventing environmental pollution and utilizing resources. A circulation type of manufacturing system has been created by designing numerous processes including a design of a product and a manufacturing line specifically in consideration of the recycling.

The camera manufacturer disassembles the used lens-fitted photo film unit. The flash device and exposure unit are cleaned, inspected and then reused. Plastic parts are melted and pelletized, and regenerated as plastic material. The lens-fitted photo film unit is originally constructed for a single use. To keep its cost low, durability of parts of the lens-fitted photo film unit is considerably low in comparison with parts used in a widely used camera. For the flash device and other parts to be reused, quality is maintained by suitable inspection and repair if desired.

The recycling is also effective in lowering a market price of the lens-fitted photo film unit. Among the various parts of the lens-fitted photo film unit, the flash device is remarkably expensive. The reuse of the flash device is highly advantageous for the purpose of lowering the cost of the lens-fitted photo film unit.

However, withdrawal of products of the used lens-fitted photo film unit to the camera manufacturer is not complete. There is a distribution of part of all the products of the used lens-fitted photo film unit to third parties, such as photo film reloading dealers, part-reusing dealers and the like. The reloading dealers load the used lens-fitted photo film unit with unexposed photo film. The part-reusing dealers utilize the used lens-fitted photo film unit, obtains parts constituting the main body, and assembles the lens-fitted photo film unit as a newly created product. The reloaded products and part-reused products are packaged, and marketed as unused products. A price of those is very inexpensive, because the flash device in the reloaded products or part-reused products is originally obtained without a costly process.

However, the reloaded products or the part-reused products are likely to have great problems in the quality because the parts are not cleaned, repaired or inspected suitably. Such problems may cause damages to reputation of the lens-fitted photo film unit with good performance, and also reputation of the camera manufacturer of the lens-fitted photo film unit.

In the case of the unsuitable reuse of parts, only limited parts, such as flash device, are reused for the reason of high cost and great ease in operation for the reuse. Remaining parts other than the flash device or the like are likely to be discarded in spite of much possibility of reuse. If the unsuitable reuse of parts is continued on a large scale, there is no achievement of purposes of the circulation type of the manufacturing system established by the camera manufacturer, the purposes being for prevention of environmental pollution, effective utilization of resources, and the like. Furthermore, advantages of a low cost caused by the reuse cannot be obtained. It may cause failure and destruction of the circulation type of the manufacturing system.

JP-A 7-120883 discloses examples of preventing unsuitable reloading of photo film on the side of the camera manufacturer. Some of the examples has been worked and used. However, there is no known technique of preventing unsuitable reuse of flash device and other relevant parts of the used lens-fitted photo film unit.

SUMMARY OF THE INVENTION

In view of the foregoing problems, an object of the present invention is to provide a lens-fitted photo film unit of which unsuitable reuse of parts can be suppressed or prevented according to distribution of used products of lens-fitted photo film units, and a flash device, and a lens-fitted photo film system.

Another object of the present invention is to provide a lens-fitted photo film unit of which a flash device can be used repeatedly by connection with a new lens-fitted photo film unit after using the initial lens-fitted photo film unit, and a flash device, and a lens-fitted photo film system.

In order to achieve the above and other objects and advantages of this invention, a flash device for a lens-fitted photo film unit pre-loaded with unexposed photo film is provided. A main capacitor stores charge. A flash emitter emits flash light. A flash circuit board charges the main capacitor, and drives the flash emitter by discharging the main capacitor in response to an exposing operation. A tightly closed flash case is secured to the lens-fitted photo film unit, for containing the main capacitor, the flash emitter and the flash circuit board.

Furthermore, a battery is contained in the flash case, for supplying the flash circuit board with power.

The lens-fitted photo film unit includes a sync switch for generating a trigger signal in response to the exposing operation. Furthermore, first and second switch contact points are disposed outside the flash case, for receiving the trigger signal from the sync switch.

The first and second switch contact points disable discharge of the main capacitor while the flash case is away from the lens-fitted photo film unit, and are short-circuited for discharge of the main capacitor upon supply of the trigger signal while the flash case is secured to the lens-fitted photo film unit.

The flash emitter includes a flash discharge tube, and a trigger electrode for trigger of the flash discharge tube. Furthermore, a trigger capacitor is charged by the flash circuit board. A trigger transformer has primary and secondary windings, the primary winding being connected with the trigger capacitor, the secondary winding being connected with the trigger electrode, operated upon discharge of the trigger capacitor, for outputting high voltage obtained by boosting voltage across the trigger capacitor. A trigger switch has the first and second switch contact points, connected with a common terminal of the primary and secondary windings in the trigger transformer, closed in response to the trigger signal, for discharging the trigger capacitor via the primary winding.

The flash circuit board includes a memory for storing information of a useful life flashing time number of times of emitting flash light in the flash emitter, the useful life flashing time number being predetermined smaller than a number of times of emitting flash light according to part useful life of the flash emitter or the flash circuit board. A counter counts a flashing time number of times of emitting flash light in the flash emitter. A switching circuit inhibits operation of the flash emitter in response to reach of the flashing time number to the useful life flashing time number.

Furthermore, a display device displays information of a present flash usability according to the flashing time number and the useful life flashing time number.

The flash usability information comprises a number of usable times according to a difference of the useful life flashing time number and the flashing time number.

In a preferred embodiment, the flash usability information represents one of first to Nth steps of a number of usable times according to a difference of the useful life flashing time number and the flashing time number, and the first step comprises a range including a highest level of the usable time number, and the first to Nth steps are determined in sequentially decreasing manner of the usable time number toward a lowest level thereof.

The lens-fitted photo film unit includes a housing connection panel opposed to the flash case, and having a receiving opening. Furthermore, a retention projection is formed to project from a case connection panel of the flash case opposed to the housing connection panel, fitted in the receiving opening, for retaining the case connection panel on the housing connection panel.

The receiving opening includes a first gap portion. A second gap portion is disposed to extend from the first gap portion, and having a size equal to or more than the first gap portion. The retention projection includes a first portion, disposed to project from the case connection panel, having a size equal to or less than the first gap portion, for being inserted therein. A second portion is disposed to project from an end of the first portion in a direction of increasing a width thereof, engaged with an inner face of the first gap portion, for preventing drop of the first portion, the second portion having a size equal to or less than the second gap portion, for being inserted in the second gap portion before setting of the first portion in the first gap portion.

After insertion into the second gap portion, the second portion is set in the first gap portion by sliding or rotating the retention projection relative to the receiving opening.

In another preferred embodiment, the lens-fitted photo film unit includes a shutter mechanism, having a shutter blade, for providing the photo film with exposure. First and second blade checking light guides are disposed so that the shutter blade is between an output end of the first light guide and an input end of the second light guide, the first and second light guides being changed over between optical intercepting and optical transmitting states according to a shift of the shutter blade. The flash circuit board includes a sync light-emitting unit, disposed outside the flash case, opposed to an input end of the first light guide, for outputting a signal of light, and sending the signal of light toward the shutter blade. A sync light-receiving unit is disposed outside the flash case, opposed to an output end of the second light guide, for detecting the signal of light incident thereon in light guide changeover between the intercepting and transmitting states, and generating the trigger signal in synchronism with opening/shutting of the shutter blade.

Furthermore, a charge allowing switch is changed over in response to connection and detachment between the flash case and the lens-fitted photo film unit, to allow charging operation of the flash circuit board upon connection of the flash case, and to inhibit charging operation of the flash circuit board upon detachment of the flash case.

Furthermore, a forcible discharging switch is connected with the main capacitor, for being changed over in response to connection and detachment between the flash case and the lens-fitted photo film unit, to allow charging operation of the main capacitor upon connection of the flash case, and forcibly to discharge the main capacitor upon detachment of the flash case.

The forcible discharging switch includes a pair of contact points. A movable switch segment is positioned on the contact points when the flash case is away from the lens-fitted photo film unit, to short-circuit the contact points. The lens-fitted photo film unit presses the switch segment when the flash case is connected therewith, for disconnecting the switch segment from at least one of the contact points.

In still another preferred embodiment, the forcible discharging switch includes a pair of contact points. A movable switch segment is positioned on the contact points when the flash case is away from the lens-fitted photo film unit, to short-circuit the contact points. A first magnet is secured to the switch segment, and opposed to the lens-fitted photo film unit. The lens-fitted photo film unit includes a second magnet, set at the first magnet when the flash case is connected therewith, for magnetically repelling and shifting the first magnet, to disconnect the switch segment from at least one of the contact points.

In another preferred embodiment, the flash emitter includes a flash discharge tube, and a trigger electrode for trigger of the flash discharge tube. Furthermore, a trigger capacitor is charged by the flash circuit board. A trigger transformer has primary and secondary windings, the primary winding being connected with the trigger capacitor, the secondary winding being connected with the trigger electrode, operated upon discharge of the trigger capacitor, for outputting high voltage obtained by boosting voltage across the trigger capacitor. A trigger switching element has first and second terminals and a gate, the first terminal being connected with a common terminal of the primary and secondary windings in the trigger transformer. An external switch has first and second switch contact points, connected with the gate of the trigger switching element, closed in response to the trigger signal, for applying voltage to the gate to render the first and second terminals conductive, whereby the trigger capacitor is discharged via the primary winding.

In still another preferred embodiment, the flash circuit includes first and second battery connection terminals. The battery includes first and second battery electrodes, disposed to extend in one common direction, and connected with respectively the first and second battery connection terminals fixedly.

According to another aspect of the invention, a lens-fitted photo film system is provided, and includes a lens-fitted photo film unit, and a flash device for emitting flash light in exposure in the lens-fitted photo film unit. The lens-fitted photo film unit includes a housing pre-loaded with unexposed photo film. An attaching portion in a predetermined shape is formed with the housing and adapted to flash attachment. A battery is contained in the housing. A first terminal is positioned outside the housing, for supplying power from the battery. The flash device includes a connection panel connectable with the attaching portion in a removable manner. A powering terminal is positioned outside the connection panel, connected with the first terminal, for supplying power to emit flash light.

The housing is box-shaped, and has a front panel, a rear panel, and first and second lateral panels. The first lateral panel is opposed to the flash device, and has the attaching portion.

The lens-fitted photo film unit further includes a sync switch, incorporated in the housing, for generating a trigger signal in response to an exposing operation. A second terminal is disposed beside the first terminal, for outputting the trigger signal from the sync switch. The flash device further includes a trigger terminal, disposed beside the powering terminal, and connected with the second terminal.

The first and second terminals are male terminals. The trigger terminal and the powering terminal are female terminals.

The connection panel includes an engaging portion, engaged with the attaching portion, for retaining the first lateral panel.

The attaching portion includes an engaging projection, and the engaging portion includes an engaging recess.

The attaching portion further includes at least one positioning ridge disposed to project from an edge of the engaging projection. The engaging portion further includes at least one positioning notch, formed in an edge of the engaging recess, and engaged with the positioning ridge.

According to still another aspect of the invention, a lens-fitted photo film unit includes a housing pre-loaded with unexposed photo film. A flash device emits flash light. An attaching portion in a predetermined shape is formed with the housing, and adapted to securing of the flash device in a removable manner. The attaching portion is used for securing a dummy block in producing a daylight type lacking the flash device.

The flash device includes a flash emitter for emitting flash light upon discharge. A flash circuit board drives the flash emitter in response to an exposing operation. A battery supplies the flash circuit board with power. A tightly closed flash case contains the flash emitter, the flash circuit board and the battery.

The housing includes a main body. At least one outer cover is substantially box-shaped, has front and rear panels, for covering the main body. The attaching portion comprises a recess, formed in the outer cover, disposed in at least the front panel, for receiving the flash device fitted therein.

The at least one outer cover includes a front cover having the front panel. A rear cover has the rear panel.

The front panel has upper and lower side lines, and first and second lateral side lines. The recess is positioned to extend from a part of the upper side line to a part of the first lateral side line.

The recess and the flash device are L-shaped as viewed from the upper side line toward the lower side line.

In another preferred embodiment, the recess and the flash device are substantially box-shaped.

According to an additional aspect of the invention, a lens-fitted photo film unit pre-loaded with unexposed photo film includes a main capacitor for storing charge. A flash emitter emits flash light. A flash circuit board charges the main capacitor, and drives the flash emitter by discharging the main capacitor in response to an exposing operation. A tightly closed flash case contains the main capacitor, the flash emitter and the flash circuit board.

Furthermore, a main body is pre-loaded with the unexposed photo film. An outer cover covers an outside of the main body. A battery is contained in the flash case, for supplying the flash circuit board with power. The flash case has a surface disposed to extend from an outer surface of the outer cover.

Instill another preferred embodiment, furthermore, a main body is pre-loaded with the unexposed photo film. An outer cover covers an outside of the main body. A battery is contained in the flash case, for supplying the flash circuit board with power. The flash case is formed with an inner surface of the outer cover.

Consequently, a flash device can be used repeatedly by connection with a new lens-fitted photo film unit after using the initial lens-fitted photo film unit, because of the construction of the flash device externally connectable with the lens-fitted photo film unit.

Also, unsuitable reuse of parts can be suppressed or prevented according to distribution of used products of lens-fitted photo film units, because distribution of used flash devices can be reduced.

BRIEF DESCRIPTION OF THE DRAWINGS

The above objects and advantages of the present invention will become more apparent from the following detailed description when read in connection with the accompanying drawings, in which:

FIG. 5 is an explanatory chart illustrating processes of distribution of the lens-fitted photo film unit and the flash device;

DETAILED DESCRIPTION OF THE PREFERRED EMBODIMENT(S) OF THE PRESENT INVENTION

Figure 1A:
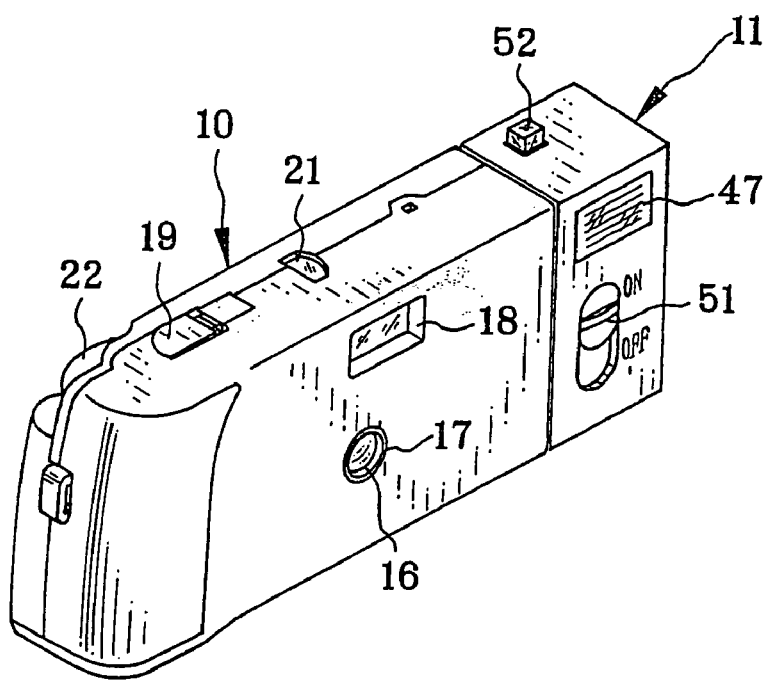
FIG. 1A is a perspective illustrating a lens-fitted photo film unit with an externally connectable flash device.
Figure 1B:
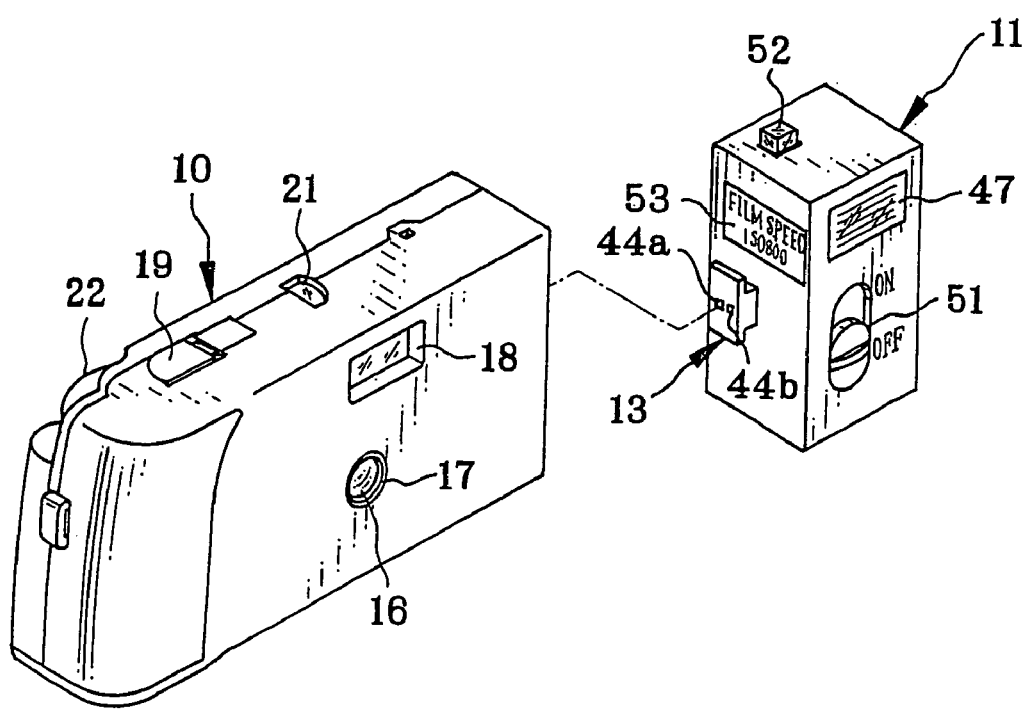
FIG. 1B is an exploded perspective illustrating the lens-fitted photo film unit and the flash device.

In FIGS. 1A and 1B, a lens-fitted photo film unit 10 is illustrated, and has a mechanism for taking an exposure and is pre-loaded with photo film. An external type of flash device 11 can be secured to the lens-fitted photo film unit 10 in a removable manner. It is possible with the flash device 11 to take an exposure according to flash photography with flashlight.

The lens-fitted photo film unit 10 is a single-use device in which the photo film is used only for one time. The flash device 11, in contrast, is a repeatedly usable device for plural strips of the photo film. A user can renew the lens-fitted photo film unit 10, to use the flash device 11 for plural times.

Figure 2:
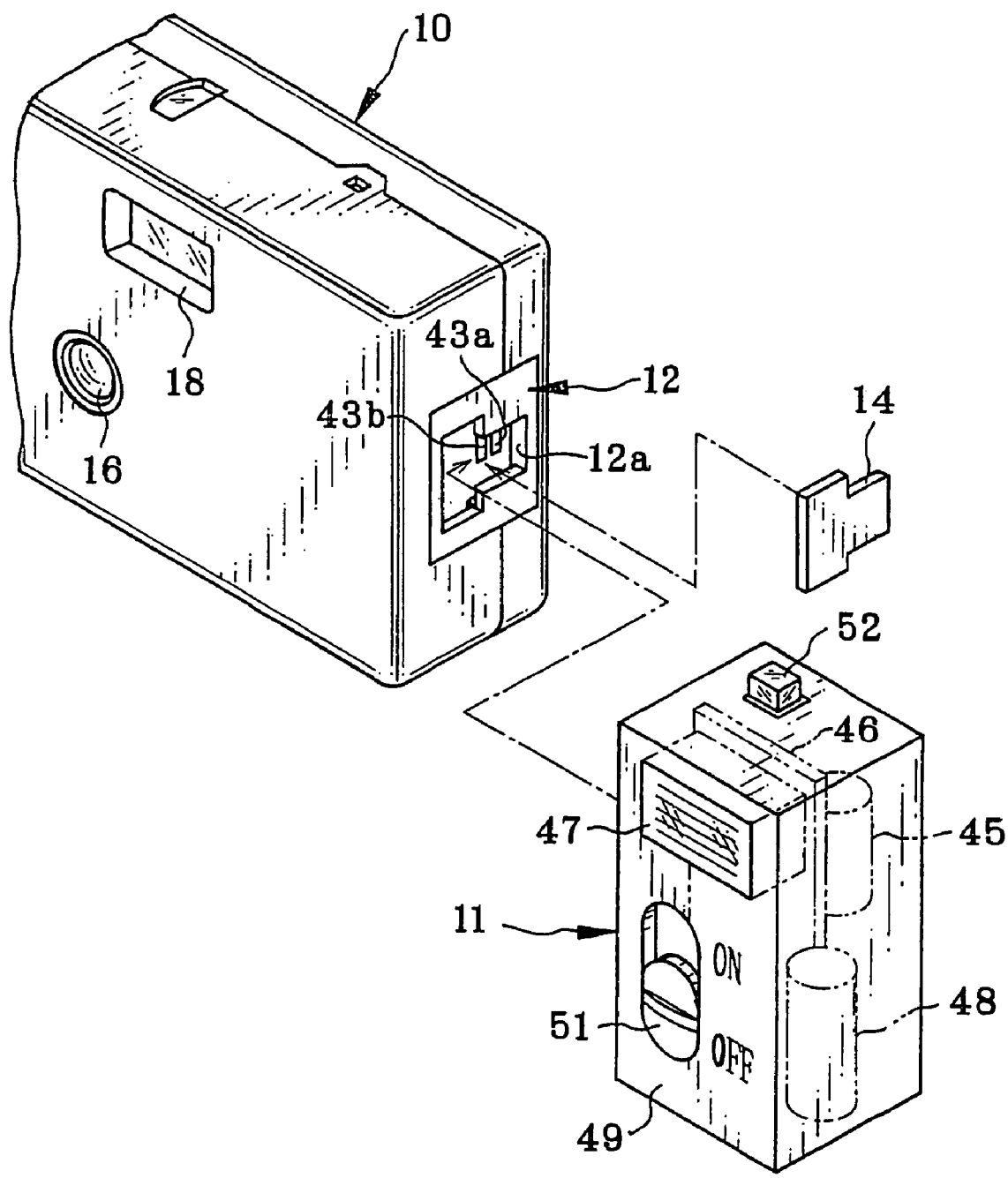
FIG. 2 is an exploded perspective illustrating the same as FIG. 1B but in which a sync switch in the lens-fitted photo film unit is viewed.

In FIG. 2, a housing connection panel 12 is included in the lens-fitted photo film unit 10, and adapted for connection with the flash device 11. A receiving opening 12a as first gap portion is formed in the housing connection panel 12. A retention projection 13 projects from the flash device 11, and is engaged with the receiving opening 12a to secure the flash device 11 fixedly to the lens-fitted photo film unit 10.

The receiving opening 12a has such a shape that its rear end portion is smaller than its front end portion. The retention projection 13 has a T-shape as viewed in section, and includes upper and lower tongue portions. The retention projection 13 is inserted in the front end portion of the receiving opening 12a. The flash device 11 is slid in the backward direction in this state, to engage the tongue portions with the rear end portion of the receiving opening 12a. The flash device 11 is secured to the lens-fitted photo film unit 10.

A protective cover 14 is used when the flash device 11 is not attached, and covers the receiving opening 12a in a closed form. The protective cover 14 prevents entry of dust, dirt or the like through the receiving opening 12a into the lens-fitted photo film unit 10. Note that a packing can be used on a lateral face of the flash device 11 in order to prevent entry of dust or the like through the receiving opening 12a when the flash device 11 is mounted on the lens-fitted photo film unit 10. Also, a magnet can be used to retain the flash device on the lens-fitted photo film unit.

A front panel of the lens-fitted photo film unit 10 includes a viewfinder objective window 18 and an opening 17 where a taking lens 16 appears. An upper panel of the lens-fitted photo film unit 10 is provided with a shutter release button 19 and a frame counter 21. A portion of a winder wheel 22 appears externally in a rear panel of the lens-fitted photo film unit 10.

Figure 3:
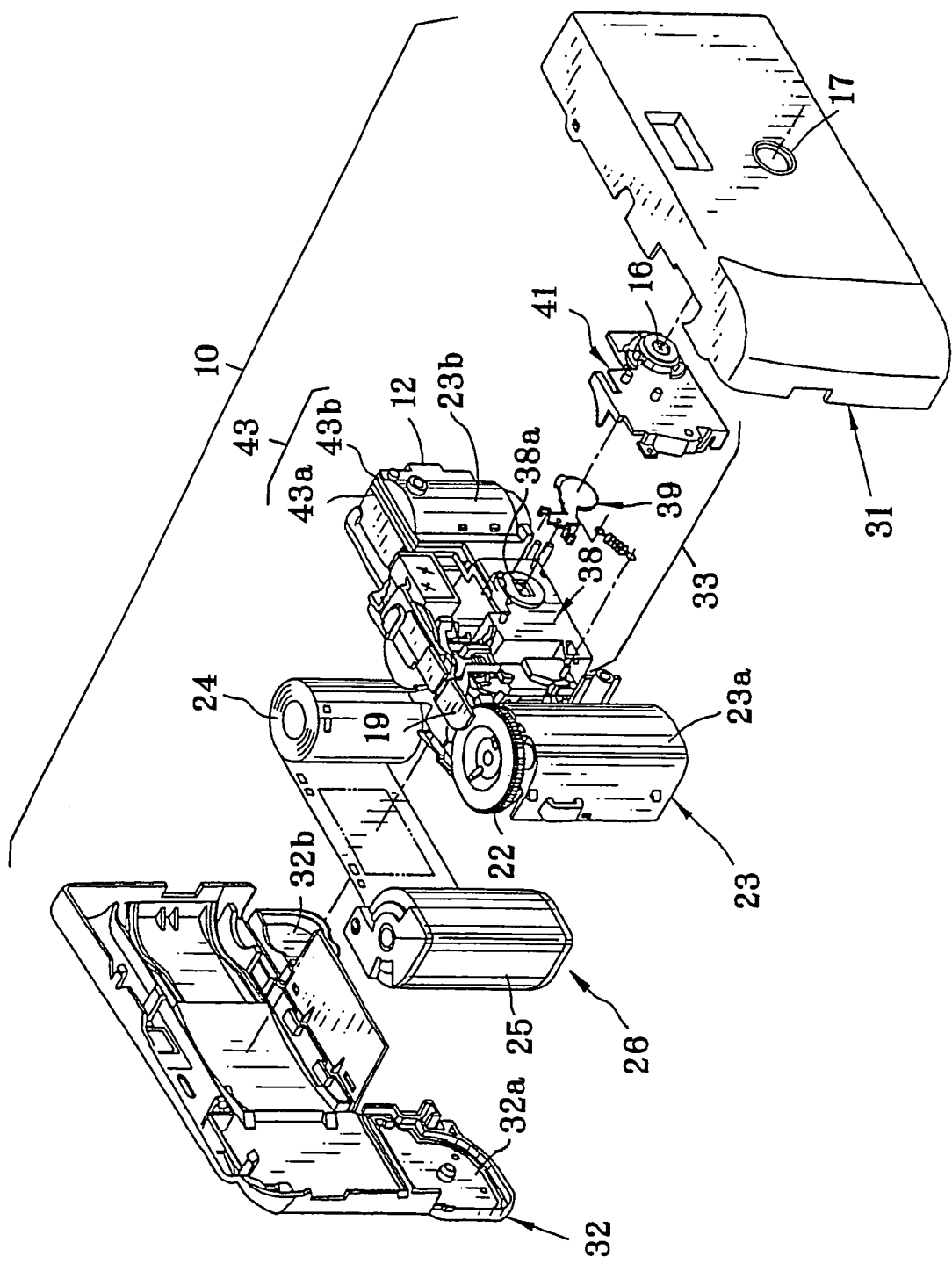
FIG. 3 is an exploded perspective illustrating the lens-fitted photo film unit.

In FIG. 3, the lens-fitted photo film unit 10 is constituted by a main body 23, a photo film cassette 26, a front cover 31, and a rear cover 32. The photo film cassette 26 includes photo film 24 and a cassette shell 25. The front and rear covers 31 and 32 as outer covers cover the main body 23 with the photo film cassette 26. An exposure unit 33 is included in the main body 23. A cassette holder chamber 23a and a roll holder chamber 23b are so disposed that the exposure unit 33 lies between those. The cassette holder chamber 23a contains the cassette shell 25. The roll holder chamber 23b contains a roll of the photo film 24 after being unwound from the cassette shell 25. The winder wheel 22 is disposed on the upside of the cassette holder chamber 23a.

A shaft (not shown) protrudes from a lower face of the winder wheel 22, and engaged with a spool in the cassette shell 25. A trailing end of the photo film 24 is inserted in a slit in the spool, and retained. When the winder wheel 22 rotates, the spool rotates to advance the photo film 24.

The exposure unit 33 includes a light-shielded tunnel 38, a shutter blade 39 as shutter mechanism, and a shutter-cover/lens-holder 41. The shutter blade 39 is disposed in front of the light-shielded tunnel 38. The shutter-cover/lens-holder 41 covers the front of the light-shielded tunnel 38 and the shutter blade 39. An exposure opening 38a is formed in a front face of the light-shielded tunnel 38, and introduces light from an object into the light-shielded tunnel 38. An exposure aperture is formed in the rear of the light-shielded tunnel 38, and defines an exposed region on the photo film 24. An aperture stop opening is formed in the shutter-cover/lens-holder 41. The taking lens 16 is held in the shutter-cover/lens-holder 41.

There is a viewfinder mechanism disposed higher than the exposure unit 33, and having objective and eyepiece lens elements. A frame counter mechanism is disposed also higher than the exposure unit 33, for indicating the number of remaining available frames on the photo film 24.

The shutter blade 39 is pivotally movable between open and shut positions, and when in the open position, opens the exposure opening 38a, and when in the shut position, allows the exposure opening 38a to open. A spring biases the shutter blade 39 toward the shut position. A knocking mechanism is disposed on the upside of the exposure unit 33, for knocking the shutter blade 39. When the winder wheel 22 is rotated to wind the photo film 24 by one frame, the knocking mechanism is charged. When the shutter release button 19 is depressed, the knocking mechanism responsively knocks the shutter blade 39. Accordingly, the shutter blade 39 moves back and forth at one time between the open and shut positions.

A sync switch 43 is disposed on an upper portion of the light-shielded tunnel 38. The sync switch 43 outputs a trigger signal in synchronism with releasing of a shutter mechanism, and sends the trigger signal to the flash device 11, and includes a pair of sync switch segments 43a and 43b of metal. A depression portion is formed with the shutter blade 39, for depressing one of the sync switch segments 43a and 43b to contact those with one another. When the shutter blade 39 comes to the open position, the sync switch 43 is turned on to send the trigger signal to the flash device 11.

The sync switch segments 43a and 43b are fixed on the main body 23. A first end of the sync switch segments 43a and 43b is disposed close to the shutter blade 39. A second end of the sync switch segments 43a and 43b extends on an outer surface of the roll holder chamber 23b and toward a lateral panel. This second end is disposed on the housing connection panel 12. A pair of connection terminals 44a and 44b as trigger switch or external switch are fixed on the retention projection 13 of the flash device 11. When the flash device 11 is secured to the main body 23, the second end of the sync switch segments 43a and 43b contacts each of the connection terminals 44a and 44b.

The front and rear covers 31 and 32 are secured to the front and rear of the main body 23, to cover the lens-fitted photo film unit 10 light-tightly. Lower lids 32a and 32b are included in the rear cover 32, and cover lowest portions of the cassette shell 25 and the photo film 24. After exposures are taken, the lower lid 32a is opened for removing the cassette shell 25.

The flash device 11 is constituted by a flash circuit board 46, a flash emitter 47, a dry battery 48 and a flash case 49. The flash circuit board 46 has a circuit pattern printed on a substrate, and includes various circuit elements in which a main capacitor 45 is included. The flash emitter 47 has a xenon discharge tube, a reflector, a diffusing plate and the like. The dry battery 48 supplies those elements with power. The flash case 49 contains any of those elements. For those parts to be assembled in the flash device 11, parts of a flash built-in type of lens-fitted photo film unit known in the prior art can be used. Furthermore, parts with as good performance and as high durability as those of the flash built-in type may be used. This manner of the use makes it possible to lower the manufacturing cost.

As is described heretofore, the flash device 11 can be used for times corresponding to plural strips of the photo film. However, the durability of parts of the flash device 11 is low in comparison with a widely used type of flash device for a camera in view of lowering the cost. If a user continues to use the flash device 11 beyond its useful life, he or she may be subjected to unexpected damages due to a decrease in the quality.

Therefore, the capacity of the dry battery 48 is predetermined at a level to prevent a user from using the flash device 11 over the useful life or period of durability of the parts. The flash case 49 is closed hermetically to keep the parts unremovable, the parts including the dry battery 48, the flash circuit board 46, the flash emitter 47. The dry battery 48 cannot be exchanged by a user. Once the dry battery 48 is used up, the flash device 11 must be discarded without further use. It is possible to lower the cost of the flash device 11 and ensure the high quality of the product.

The flash device 11 after being used is withdrawn by a photo finisher to a camera manufacturer, and recycled, in a similar manner to the lens-fitted photo film unit 10. The camera manufacturer disassembles, cleans and inspects the flash device 11, and reuses its parts after renewal or repair as required. The dry battery 48 is recycled by a specialized dealer.

A diffusing plate for the flash emitter 47 appears externally in front of the flash case 49. A sliding button 51 is disposed under the diffusing plate. A charger switch of the flash circuit is associated with the sliding button 51. The sliding button 51 is slidable between on and off positions, and when in the on position, turns on the charger switch to start charging, and when in the off position, turns off the charger switch to stop charging.

A readiness indicator 52 is disposed in an upper panel of the flash case 49 for informing that charging is completed to stand by for an exposure. An example of the readiness indicator 52 is a light guide for optically guiding light from an LED (light-emitting diode) on the flash circuit. Note that the readiness indicator 52 may be disposed behind the flash case 49. Also, the readiness indicator 52 may be linked with the sliding button 51, and when the sliding button 51 is in the on position, may protrude from the outer surface of the flash case 49, and when the sliding button 51 is in the off position, may be contained in the flash case 49.

An information label or sticker 53 is attached to a case connection panel of the flash case 49, and disposed higher than the retention projection 13. An amount of light emitted by the flash device 11 is determined according to various factors including the speed of the photo film 24, an f-number of the taking lens and the like. The information sticker 53 includes printed information of the speed of the photo film 24, the f-number of the taking lens and the like associated with the flash device 11. As the flash device 11 is the externally connectable type, it is possible for a user to check the information on the information sticker 53 specially if he or she buys the lens-fitted photo film unit 10 separately. This enables him or her to select a suitable type of the lens-fitted photo film unit 10 as the information sticker 53 can be checked easily.

Examples of the dry battery 48 are an alkali manganese battery, a lithium battery, and the like of 1.5 volts between electrodes. Capacity of the dry battery 48 is determined at such a small level that flash emission is possible for all frames of two strips of the photo film. In general, there is small possibility of emitting flash light for all the frames in each photo film strip in consideration of statistics. Even this small level of the capacity is sufficient for exposing frames for three photo film strips. It is naturally possible to determine the capacity of the dry battery 48 further in view of the useful life of the relevant parts or the like.

Figure 4:
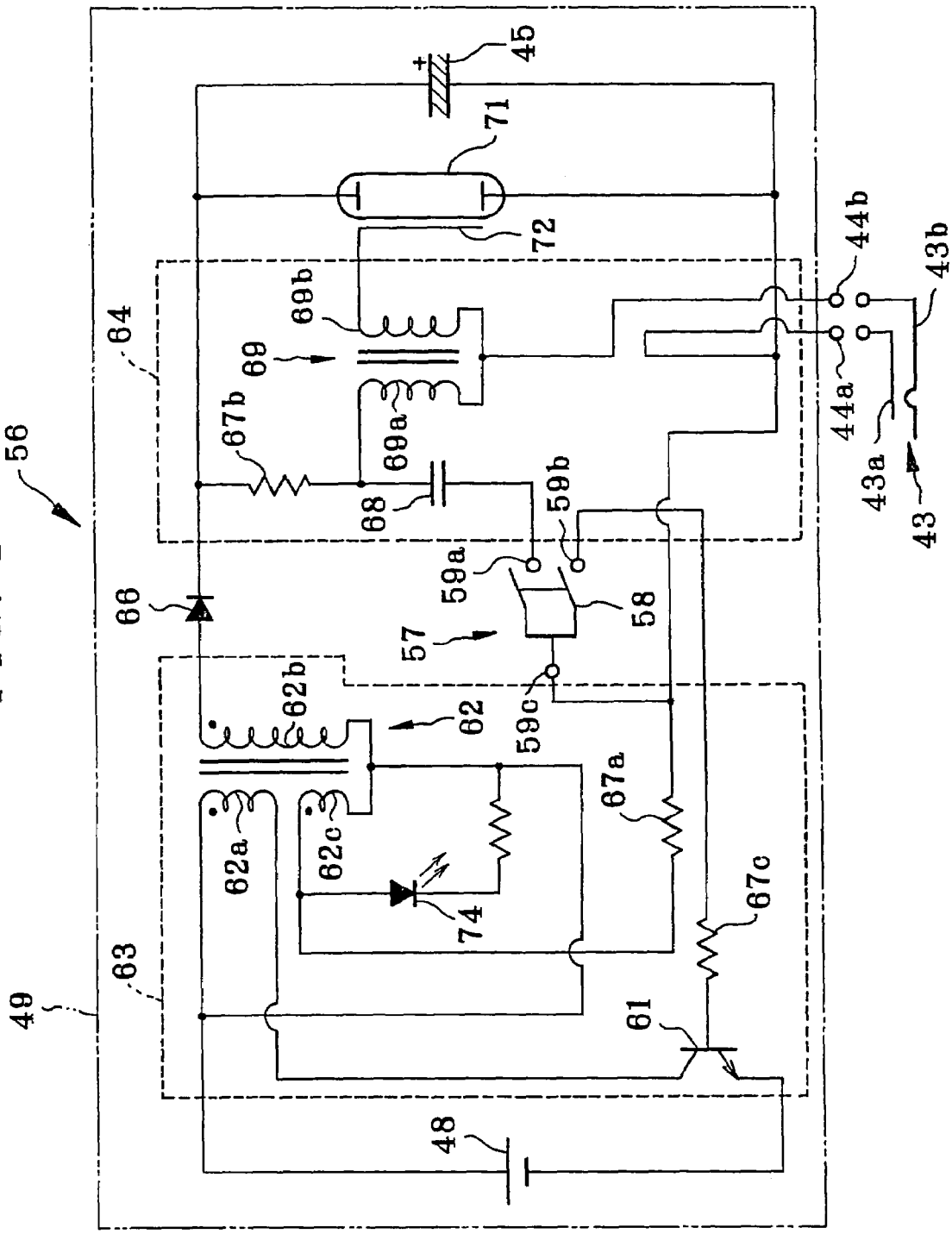
FIG. 4 is a circuit diagram illustrating a flash circuit in the lens-fitted photo film unit.

In FIG. 4, circuit arrangement of a flash circuit 56 is illustrated. A charger switch 57 is constituted by three contact points 59a, 59b and 59c and a movable segment 58. A first end of the movable segment 58 is connected with the third contact point 59c. When the sliding button 51 is shifted to the on position, second ends of the movable segment 58 come in contact with the contact points 59a and 59b, electrically to interconnect the contact points 59a, 59b and 59c.

There are an oscillation transistor 61 of an n-p-n type and an oscillation transformer 62, a combination of which constitutes a booster 63 operating according to blocking oscillation. Voltage output by the dry battery 48 is converted by the booster 63 to as high voltage as 300 volts, to charge the main capacitor 45. The oscillation transformer 62 includes a primary winding 62a, a secondary winding 62b and a tertiary winding 62c combined in mutual induction. A first end of the primary winding 62a is connected with a positive electrode of the dry battery 48. A second end of the primary winding 62a is connected with a collector of the oscillation transistor 61. A first end of the secondary winding 62b is connected with an anode of a rectification diode 66. A second end of the secondary winding 62b is connected with a positive electrode of the dry battery 48 together with a first end of the tertiary winding 62c. A second end of the tertiary winding 62c is connected via a resistor 67a with the third contact point 59c of the charger switch 57.

A cathode of the rectification diode 66 is connected with one terminal of a trigger capacitor 68 via a resistor 67b, and also with one terminal of the main capacitor 45 on the positive side. A second terminal of the trigger capacitor 68 is connected with the contact point 59a of the charger switch 57. An emitter of the oscillation transistor 61 is connected with a negative electrode of the dry battery 48. A base of the oscillation transistor 61 is connected with the contact point 59b via a resistor 67c.

A trigger transformer 69 includes a primary winding 69a and a secondary winding 69b combined in mutual induction. A first end of the primary winding 69a is connected with a terminal of the trigger capacitor 68. A first end of the secondary winding 69b is connected with a trigger electrode 72, which is disposed close to a flash discharge tube 71 incorporated in the flash emitter 47. Second ends of the primary and secondary windings 69a and 69b are combined as one common terminal, which is connected with the charger switch 57 via the sync switch 43. Electrodes of the flash discharge tube 71 are connected with terminals of the main capacitor 45 in a parallel form.

A series of the elements including the trigger capacitor 68, the primary winding 69a, the sync switch 43, the charger switch 57 and then the trigger capacitor 68 constitutes a trigger circuit 64, by which a current from the trigger capacitor 68 upon discharge is caused to flow in the primary winding 69a upon turning on the sync switch 43.

When the charger switch 57 is turned on, the oscillation transistor 61 becomes conductive, to cause a current to flow in the primary winding 62a as a collector current of the oscillation transistor 61. In the secondary winding 62b, there occurs electromotive force according to a ratio between the numbers of the turns in the primary and secondary windings 62a and 62b. An output current in the secondary winding 62b flows as a base current to the oscillation transistor 61. In other words, feedforward operation of the oscillation transformer 62 causes oscillation, and increases a collector current in the oscillation transistor 61. The output current generated in the secondary winding 62b flows also to the main capacitor 45 and the trigger capacitor 68, to charge both of those.

There is an LED (light-emitting diode) 74 as sync light-emitting unit, having an anode and cathode connected with terminals of the tertiary winding 62c in parallel. When the voltage across the main capacitor 45 being charged comes up to a predetermined voltage level, voltage across the tertiary winding 62c comes up above a predetermined level, to drive the LED 74. Light emitted by the LED 74 is guided by a light guide to the readiness indicator 52.

The sync switch 43 is turned on in the state of fully charging the main capacitor 45. Then the trigger circuit 64 is closed, to cause a current of discharge of the trigger capacitor 68 to flow in the primary winding 69a. In response to this, a trigger voltage is output in the secondary winding 69b at a high level, and is applied to the flash discharge tube 71 by the trigger electrode 72. The main capacitor 45 is discharged in a path with the flash discharge tube 71, in which charge passes to emit flash light.

Note that it is possible to combine an auto-cutting circuit with the flash circuit for preventing a restart of charging typically upon occurrence of natural discharge after charging. Thus, wasteful use of the dry battery 48 can be prevented even if a user fails to turn off the charger switch.

The operation of the above embodiment is described with reference to FIG. 5. A flow is illustrated in FIG. 5, including steps from an photographing operation at a user to a recycling operation at the end.

A camera manufacturer manufactures the lens-fitted photo film unit 10 and the flash device 11. The flash device 11 is an externally connectable type. The lens-fitted photo film unit 10 can be used to take photographs even without combining the flash device 11. Efficiency in the manufacture can be high, because it is possible for the camera manufacturer to reduce the types of lens-fitted photo film units for flash photography and daylight photography.

The lens-fitted photo film unit 10 and the flash device 11 are shipped by a camera manufacturer to photo shops, and supplied to users. The lens-fitted photo film unit 10 is sold in combination with the flash device 11 as a set, and also sold as a single product.

As the lens-fitted photo film unit 10 can be used without the flash device 11, a user who intends photographs without flash buys only the lens-fitted photo film unit 10. In contrast, another user who intends flash photography buys both the lens-fitted photo film unit 10 and the flash device 11.

When the flash device 11 is secured to the lens-fitted photo film unit 10, the sync switch segments 43a and 43b of the sync switch 43 contact respectively the connection terminals 44a and 44b of the flash device 11, to connect the sync switch 43 to the flash circuit board 46.

When the sliding button 51 is slid to the on position, the charger switch 57 is turned onto start charging the main capacitor 45. When the voltage across the main capacitor 45 being charged comes up to the predetermined voltage level, then the LED 74 comes to illuminate to turn on the readiness indicator 52. Thus, a user is informed of the completion of the charging.

When the shutter release button 19 is depressed, the shutter blade 39 is knocked abruptly, to take an exposure on the photo film 24. When the shutter blade 39 comes to the open position, the sync switch segments 43a and 43b are interconnected to turn on the sync switch 43. The trigger circuit 64 is operated to emit flash light.

When all frames in the photo film 24 are exposed, then the user brings or forwards the lens-fitted photo film unit 10 to a photo shop, and requests printing to a photo finisher. The photo finisher receives the lens-fitted photo film unit 10 containing the photo film 24, and subjects the photo film 24 to printing. The photo film 24 after being developed is returned to the user at the same time as photographic prints are supplied to him or her. The used body of the lens-fitted photo film unit 10, in contrast, is withdrawn to the camera manufacturer.

The flash device 11 can be used until the dry battery 48 is used up. After this, a user removes the flash device 11 from the lens-fitted photo film unit 10 and preserves for next use. He or she will buy an unused lens-fitted photo film unit 10 without the flash device 11. The flash device 11 being preserved will be connected with the lens-fitted photo film unit 10, and operated for exposures with flash light.

Thus, the flash device 11 can be used repeatedly. A user can take photographs with flash by buying only the lens-fitted photo film unit 10 at next time of exposure. Also, the flash device 11 is an externally connectable type. If a user desires photographs without flash, he or she can buy the lens-fitted photo film unit 10 without buying the flash device 11. It is possible to reduce the cost per one photograph according to the using manner of the user.

When the dry battery 48 in the flash device 11 is used up, no charging can be effected. The readiness indicator 52 does not illuminate. A user is informed by this state of the readiness indicator 52 that the dry battery 48 is used up.

The flash device 11 after using up the dry battery 48 is withdrawn by photo finishers and forwarded to a camera manufacturer. Note that a user may bring the flash device 11 solely to a photo finisher without the lens-fitted photo film unit 10, and also may bring the flash device 11 together with the lens-fitted photo film unit 10 to a photo finisher.

When the photo film 24 is completely used, the lens-fitted photo film unit 10 is forwarded to a photo laboratory at a photo finisher. In contrast, the flash device 11 can be used for a considerable number of times for an amount of plural photo film strips. Thus, the number of forwarding the flash device 11 to a photo laboratory is reduced in comparison with the known techniques. Distribution of the flash device 11 to reloading dealers, part-reusing dealers or the like in the market can be suppressed. Unauthorized reloading or handling of parts or products can be reduced.

The lens-fitted photo film unit 10 does not include a flash device with a high cost. This will cause reduction of distribution of the used lens-fitted photo film units to a reloading dealer, part-reusing dealer or the like in the market. The proportion of genuine withdrawal of the lens-fitted photo film unit 10 at the original camera manufacturer can be higher. Therefore, the resources can be utilized effectively by reducing the abandonment. Pollution of the environment can be prevented.

The lens-fitted photo film unit 10 and the flash device 11 withdrawn by the camera manufacturer are recycled in a suitable method. The flash device 11 is disassembled. Its parts are cleaned, inspected, and repaired if required. The parts are assembled again in a new flash case with a new battery, and are reused. The used flash case is pelletized, and reused as regenerated plastic material. The used battery is withdrawn by a specialized dealer, and recycled.

In the above embodiment, the connection terminals 44a and 44b for connection with the sync switch 43 in the lens-fitted photo film unit 10 are disposed on the surface of the retention projection 13 outside the flash device 11. If the flash device 11 is removed from the lens-fitted photo film unit 10 after charging the main capacitor 45, it is likely that a user s fingers touch erroneously the connection terminals 44a and 44b, and receive electrical shock by short-circuiting. The flash device 11 immediately after charging is very dangerous, as high voltage is applied to the connection terminals 44a and 44b in the same manner as the main capacitor 45. Consequently, it is desirable to dispose the connection terminals 44a and 44b in a position hard to touch externally, for example in a rear surface of tongues of the retention projection 13.

Figure 6A:
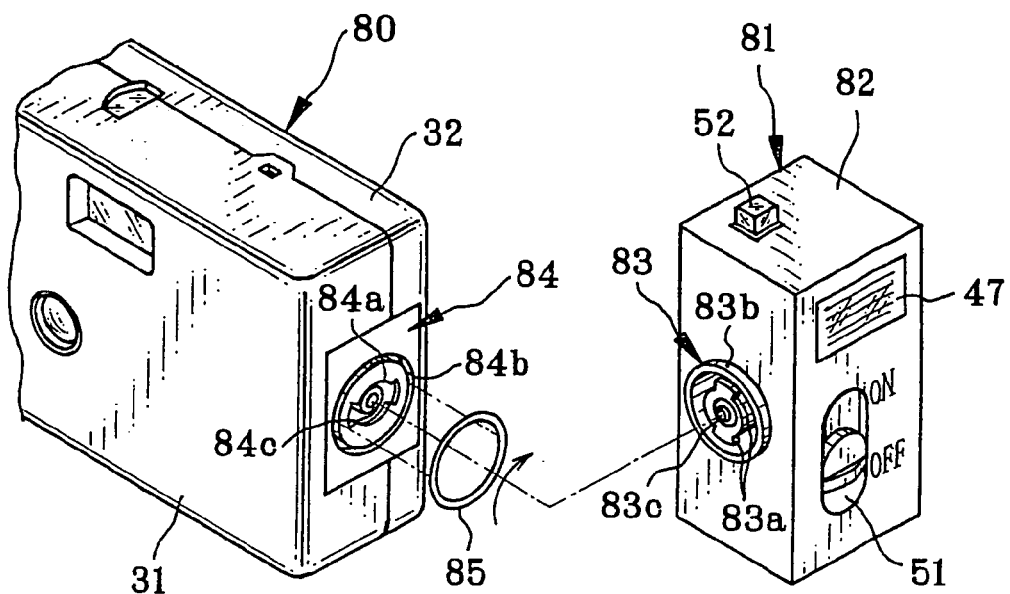
FIG. 6A is an exploded perspective illustrating another preferred embodiment with a flash device connectable with a bayonet mechanism.
Figure 6B:
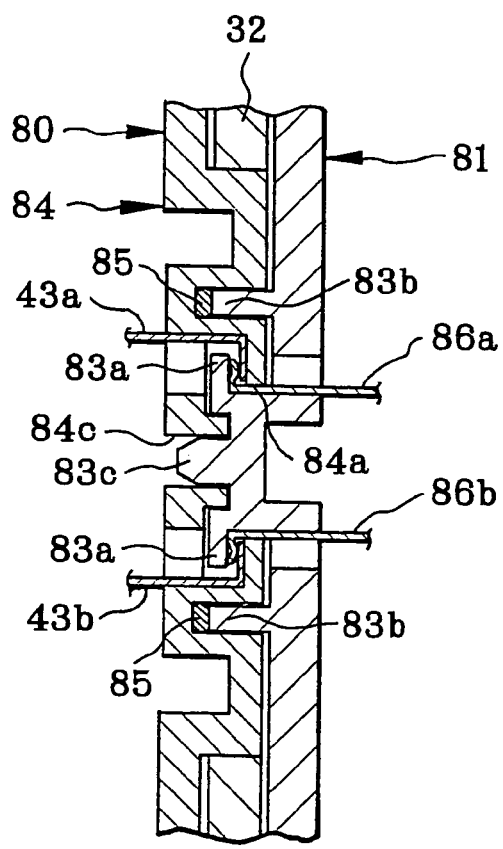
FIG. 6B is a section, partially broken, illustrating the bayonet mechanism of FIG. 6A.

Another preferred embodiment is described with reference to FIGS. 6A and 6B, in which connection of a bayonet type is used. Elements similar to those in the above embodiments are designated with identical reference numerals. A flash device 81 includes a flash case 82, in which an engaging mechanism 83 is disposed on a case connection panel. For use with this, a lens-fitted photo film unit 80 has a housing connection panel 84. There are a receiving opening 84a as first gap portion, and an engaging groove 84b for engagement with the engaging mechanism 83. A pair of retention projections 83a as second portion are formed with the engaging mechanism 83, for engagement with the receiving opening 84a. A ridge 83b is formed on the periphery of the retention projections 83a for engagement with the engaging groove 84b. A pin 83c as first portion projects from the center of the engaging mechanism 83. An engaging hole 84c is formed in the center of the housing connection panel 84 for engagement with the pin 83c.

Note that the lens-fitted photo film unit 80 can be used solely. If the housing connection panel 84 has a conspicuously projecting or retreating shape, neat appearance of the lens-fitted photo film unit 80 is degraded by the housing connection panel 84. It is thus preferable that a surface of the housing connection panel 84 is flush with a surface of the front and rear covers 31 and 32. Also, a protective cover may be added for covering the housing connection panel 84 in a manner the same as the above embodiment.

An O-ring 85 is fitted in the engaging groove 84b. The O-ring 85 tightens the fitted state between the engaging groove 84b and the ridge 83b, and prevents entry of foreign matter into the lens-fitted photo film unit 80 or the flash device 81, the foreign matter including dust, dirt, water and the like.

To connect the flash device 81, the flash device 81 is inclined to position the retention projections 83a for insertion into the receiving opening 84a. The engaging mechanism 83 is inserted into the receiving opening 84a, before the flash device 81 is rotated to a set position. Thus, the engaging mechanism 83 is fixedly retained on the housing connection panel 84, to connect the flash device 81 with the lens-fitted photo film unit 80.

A pair of contact points 86a and 86b are attached behind the retention projections 83a, and connected with the trigger circuit. The sync switch segments 43a and 43b are disposed inside the receiving opening 84a of the housing connection panel 84, and constitutes the sync switch 43. When the engaging mechanism 83 is engaged with the receiving opening 84a, the contact points 86a and 86b come in contact with the sync switch segments 43a and 43b.

The contact points 86a and 86b cannot be easily touched by a finger from outside, because located behind the retention projections 83a. This is effective in keep safety even when the flash device 81 is removed from the lens-fitted photo film unit 80 after charging.

Figure 7A:
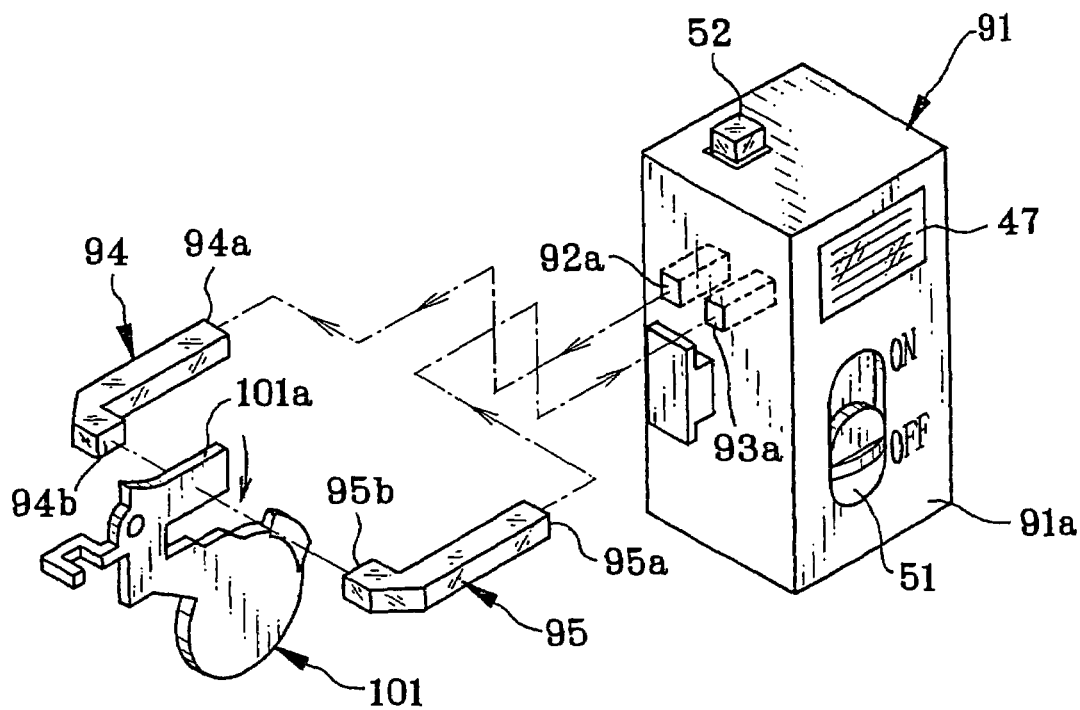
FIG. 7A is an exploded perspective illustrating a preferred embodiment a trigger signal of light is used and treated by a sync light-emitting unit and sync light-receiving unit in a flash device.
Figure 7B:
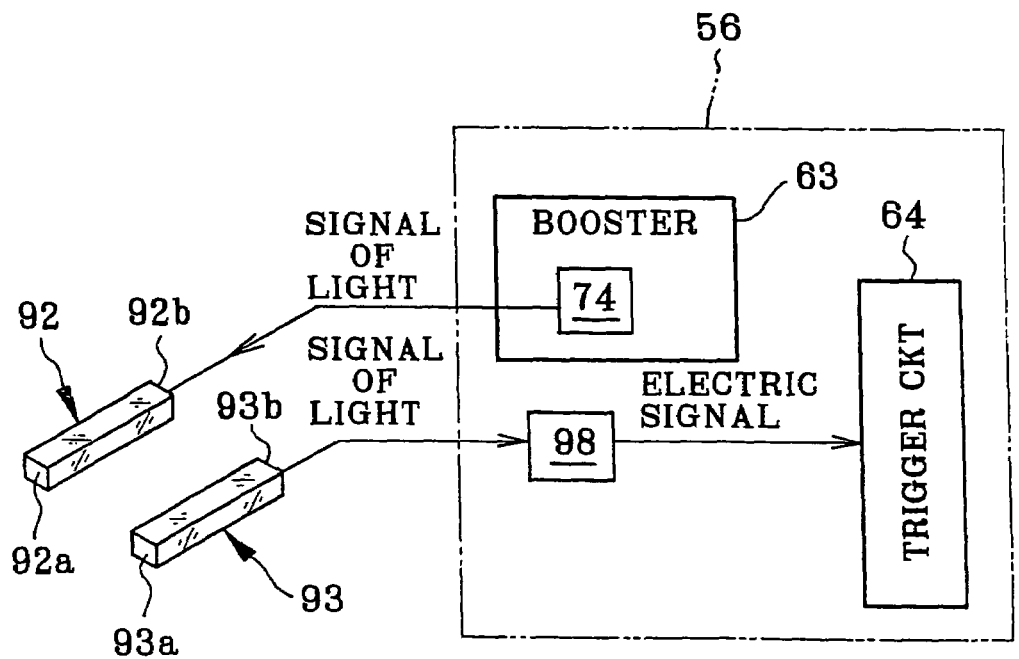
FIG. 7B is a block diagram illustrating a flash circuit in the flash device of FIG. 7A.

In the above embodiment, the trigger signal sent from the lens-fitted photo film unit from the flash device is electric. Another preferred flash device 91 is depicted in FIGS. 7A and 7B, in which an optical trigger signal of light is sent from a lens-fitted photo film unit.

The flash device 91 includes an output light guide 92 of a sync light-emitting unit, and an input light guide 93 of a sync light-receiving unit. The flash device 91 has a flash case 91a, having a lateral panel where a first end 92a of the output light guide 92 and a first end 93a of the input light guide 93 appear. A second end 92b of the output light guide 92 is disposed near to the LED 74 in the booster 63, the LED 74 indicating readiness after charging. Light from the LED 74 is sent to the readiness indicator 52, and used as a trigger signal for the flash device 91.

The light from the LED 74 is passed through the output light guide 92, and sent to the lens-fitted photo film unit. The light is then passed in synchronism with releasing of the shutter, passed through the input light guide 93 and sent back to the flash device 91. A second end 93b of the input light guide 93 is disposed near to a photo receptor element 98 as sync light-receiving unit. The photo receptor element 98 is connected with the trigger circuit 64, sends an electric signal to the trigger circuit 64 upon receiving the light from the input light guide 93. A thyristor (not shown) is connected on a line of discharge of the trigger circuit 64. When the electric signal is input to the gate of the thyristor, then the thyristor is turned on. The trigger capacitor and the main capacitor are discharged to emit flash light.

The lens-fitted photo film unit has a sync switching device, which includes blade checking light guides 94 and 95. The blade checking light guide 94 has an input end 94a which appears externally outside the lens-fitted photo film unit. The blade checking light guide 95 has an output end 95a which appears externally outside the lens-fitted photo film unit. When the flash device 91 is connected with the lens-fitted photo film unit, the input end 94a of the blade checking light guide 94 is opposed to the first end 92a of the output light guide 92. The output end 95a of the blade checking light guide 95 is opposed to the first end 93a of the input light guide 93.

There is a shutter blade 101 as shutter mechanism. Near to the shutter blade 101 are disposed an output end 94b of the blade checking light guide 94 and an input end 95b of the blade checking light guide 95. The input end 95b is opposed to the output end 94b.

A movable sync segment 101a is formed with the shutter blade 101. When the shutter blade 101 is in the shut position, the movable sync segment 101a is located between the output end 94b of the blade checking light guide 94 and the input end 95b of the blade checking light guide 95, to intercept a light path from the output end 94b to the input end 95b. When the shutter blade 101 rotates to the open position, the movable sync segment 101a comes away from the light path. The light exited from the output end 94b comes incident upon the input end 95b, and then is directed back to the input light guide 93 in the flash device 91.

Therefore, the optical trigger signal of light is used and sent from the lens-fitted photo film unit to the flash device 91. Safety can be kept because no uncovered contact points appear on the surface of the flash case 91a.

Figure 8A:
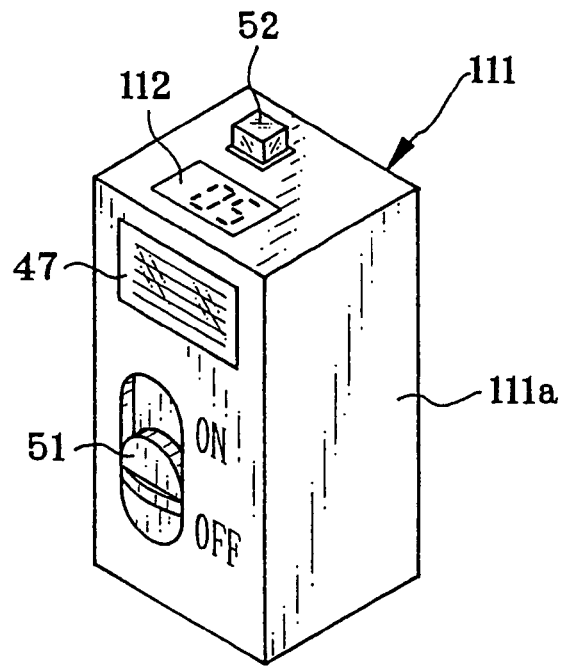
FIG. 8A is a perspective illustrating another preferred flash device with a residue display panel.

In the above embodiment, the term of the use of the flash device is informed to users by means of discontinuation of illumination of the readiness indicator 52 upon using up the battery. In FIG. 8A, a flash device 111 is illustrated, and includes a residue display panel 112 for informing a user of the present availability of flash emission. The residue display panel 112 consists of an LCD (liquid crystal display) panel, and digitally indicates the number of times of flash emission possible as remainder. Therefore, the residue display panel 112 enables a user to find information of possibility of using the flash device 111 after the start of the use.

A predetermined number of flashing is stored in the flash device 111 according to the useful life of relevant parts. The number of flashing is stepped decrementally at each time of flashing, so as to indicate the number of times of flashing possible as remainder. When the indicated number comes down to zero (0), the charging is disabled. The flash device 111 becomes ineffective irrespective of existence or lack of residual capacity of the battery. It is unnecessary to determine capacity of the battery according to the useful life of the parts.

Figure 9:
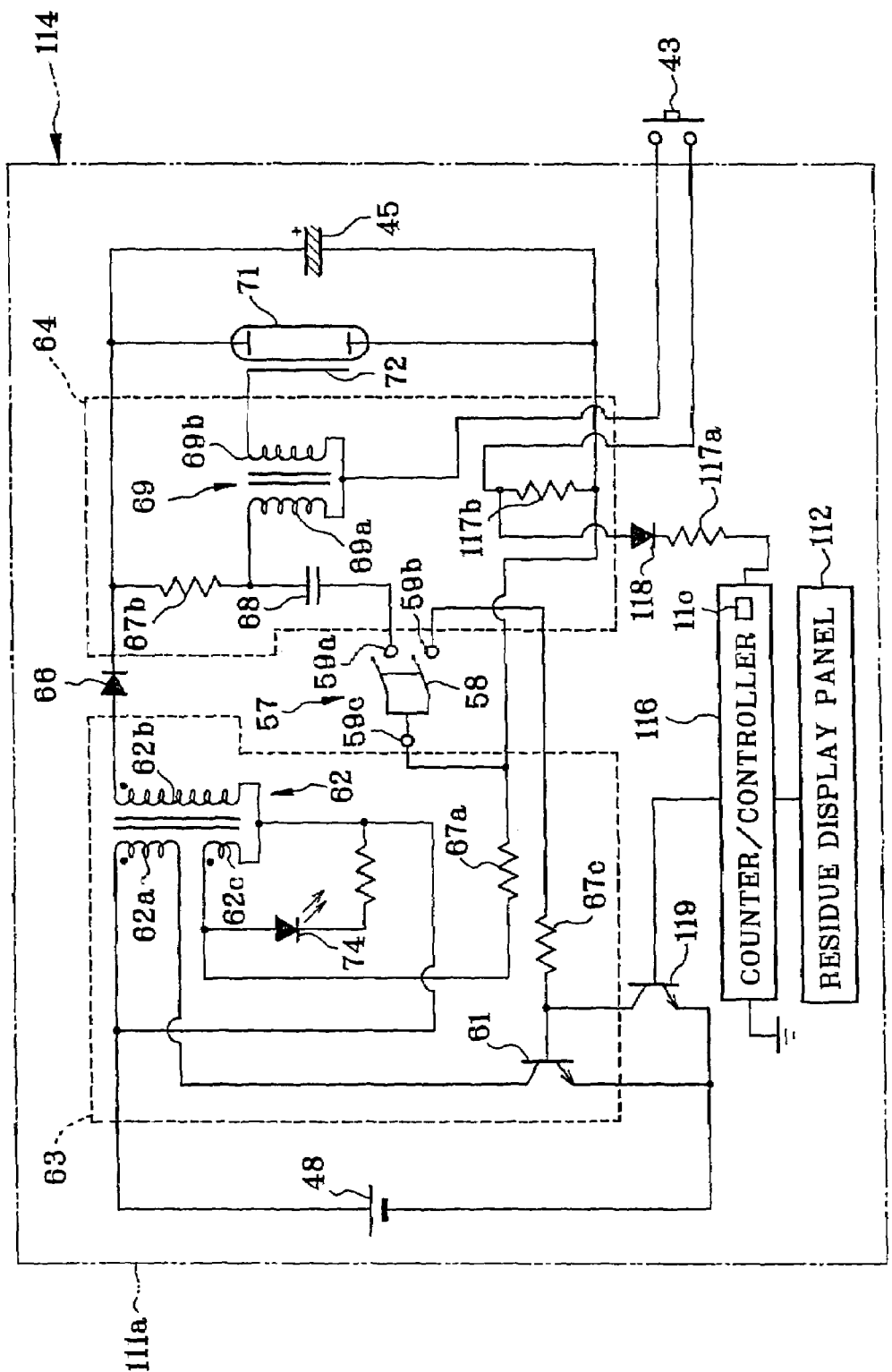
FIG. 9 is a circuit diagram illustrating a flash circuit of the flash device of FIG. 8A.
Figure 10:
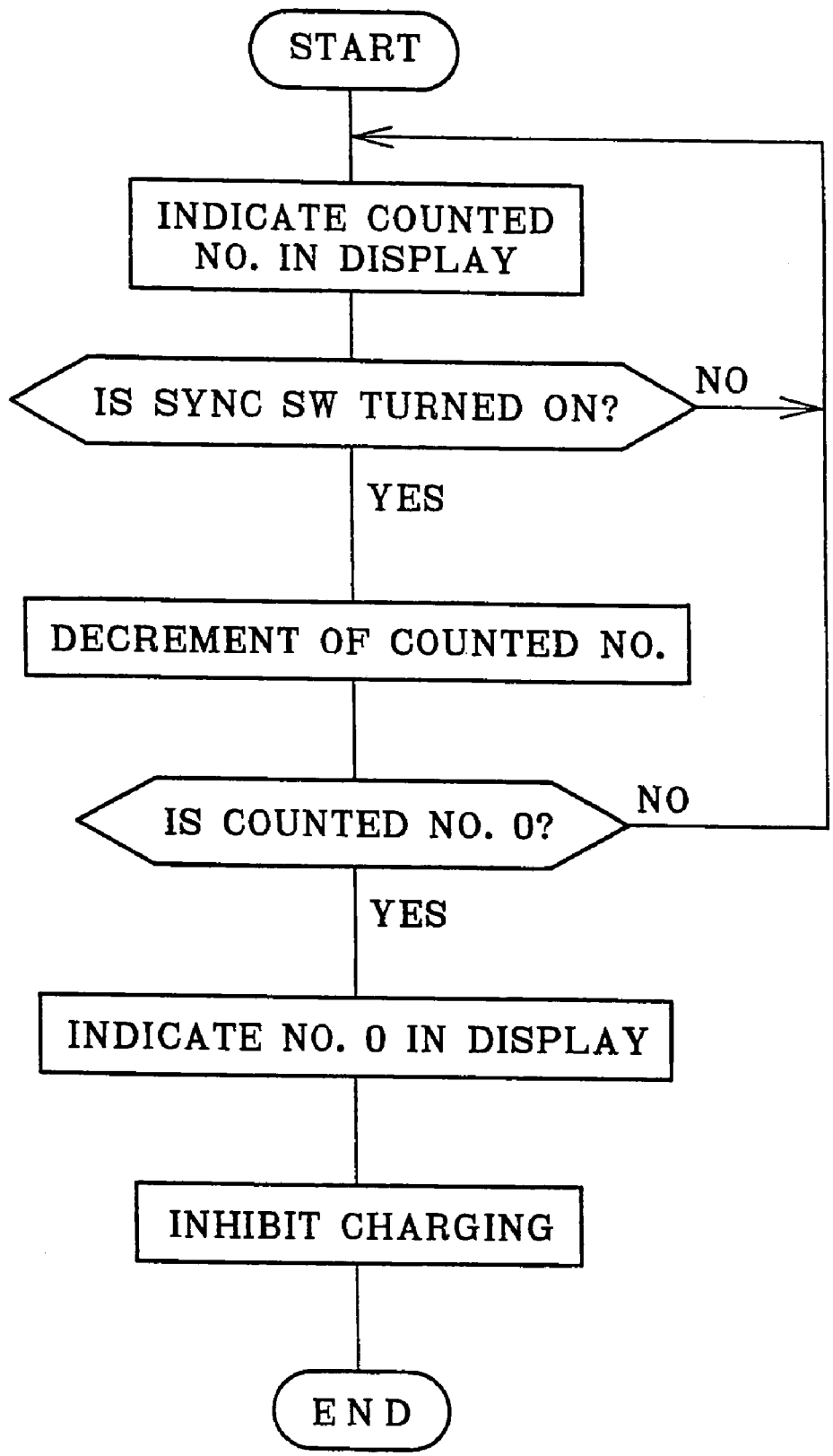
FIG. 10 is a flow chart illustrating a process of counting and controlling flash emission.

In FIG. 9, a flash circuit board 114 for use with the residue display panel 112 is illustrated. In FIG. 10, a flow of control of a counter/controller 116 for counting the number of times of flash emission is illustrated. The counter/controller 116 is connected with the trigger circuit 64, and detects a current of discharge from the trigger capacitor 68. Resistors 117a and 117b restrict a flow of the current of the discharge toward the counter/controller 116. A rectification diode 118 prevents a reverse flow of the current of the discharge. In a memory 110 of the counter/controller 116, a predetermined number of times of flash emission is stored. Upon detection of the current of the discharge, the counter/controller 116 determines that the sync switch 43 is turned on, and steps down the counted number by one, and outputs the number in the residue display panel 112.

A disabling transistor 119 as switching circuit has a base, with which the counter/controller 116 is connected. When the counted number in the counter/controller 116 becomes zero (0), the counter/controller 116 renders the disabling transistor 119 conductive. A collector of the disabling transistor 119 is connected with the tertiary winding 62c of the oscillation transformer 62. When the disabling transistor 119 becomes conductive, a current from the tertiary winding 62c flows in the disabling transistor 119, so that the oscillation transistor 61 becomes non-conductive and disables charging.

Figure 8B:
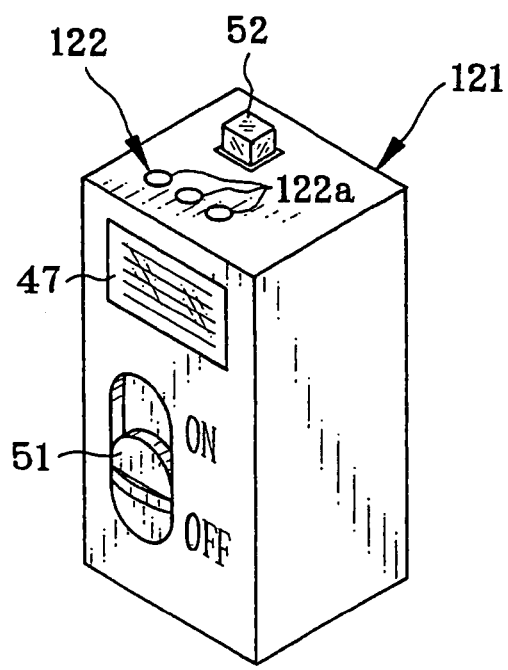
FIG. 8B is a perspective illustrating an embodiment with a residual amount indicator.

Instead of using the residue display panel 112, another preferred flash device 121 in FIG. 8B includes a residual amount indicator 122 as display panel for indication in a stepwise manner. Plural light-emitting diodes (LEDs) 122a are included in the residual amount indicator 122. The number of LEDs driven in the LEDs 122a changes according to the counted number.

While the lens-fitted photo film unit is unused, all the LEDs 122a emit light. According to emission of flash light, the counted number decreases, to turn off the LEDs 122a serially. When the counted number comes down to zero (0), all the LEDs 122a are turned off. Note that the number of the LEDs 122a may be two, or four or more. Also, only one light-emitting diode (LED) may be used. When the counted number becomes a predetermined limit number or lower, then the LED can be driven, to inform a user of a state with small residual life.

In the above embodiment, the residual amount indicator 122 may be set for illumination of all the three LEDs for an initially used step when the number of times of the use is zero (0) or more and equal to or less than a predetermined number of times. However, it is possible in the residual amount indicator 122 to illuminate at all the three LEDs for an unused step when the number of times of the use is zero (0), and to illuminate at the two LEDs distinctly for an initially used step when the number of times of the use is one (1) or more and equal to or less than a predetermined number.

In the above embodiment, one LED in the residual amount indicator 122 illuminates when the residual time number or number of times of usability is one (1) or more and equal to or less than a predetermined number. All the LEDs are turned off in the residual amount indicator 122 when the number of times of usability is zero (0). Alternatively, it is possible in the residual amount indicator 122 to turn off all the LEDs when the number of times of usability comes down to a predetermined small number and until the number of times of usability comes down zero (0). Furthermore, the final step of the use, instead of being represented by turning off all the LEDs, can be represented by turning on only one LED with appearance of expressing a small amount.

In the above embodiment, the flash device has the contact points for sending the trigger signal from the lens-fitted photo film unit. As high voltage is applied to the contact points immediately after the charging, a user is likely to receive electric shock. The embodiments described heretofore are directed to the improvement of the position of the contact points, and the use of the optical trigger signal for the purpose of not using contact points.

Figures 11A, 11B:
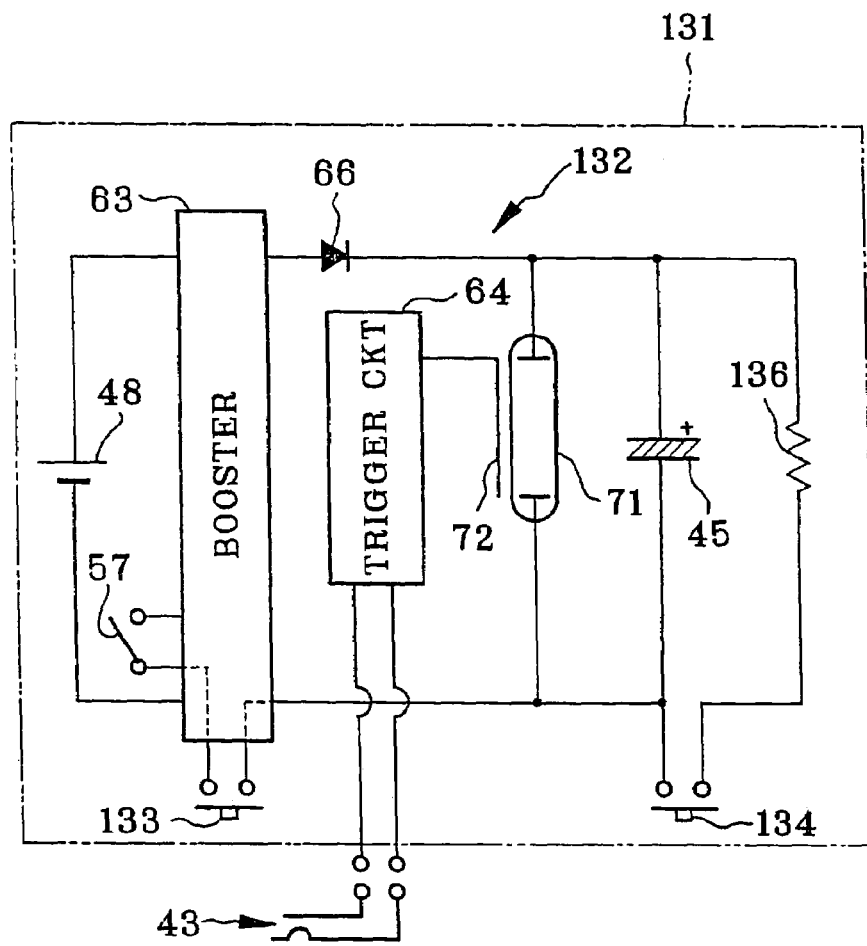
FIG. 11A is a block diagram illustrating a flash device having a charge allowing switch and a forcible discharging switch.
FIG. 11B is a table illustrating states of the switches.

Still another preferred embodiment is described, in which danger of electric shock can be avoided. In FIGS. 11A and 11B, a flash circuit board 132 in a flash device 131 is provided with a charge allowing switch 133 and a forcible discharging switch 134.

The charge allowing switch 133 is connected with the booster 63, and when the flash device 131 is connected with the lens-fitted photo film unit, is turned on to allow the charging, and when the flash device 131 is removed from the lens-fitted photo film unit, is turned off to inhibit the charging. The forcible discharging switch 134 is connected in parallel with the main capacitor 45, and turned on when the flash device 131 is removed from the lens-fitted photo film unit, to discharge the main capacitor 45. A resistor 136 is used for the discharge. When the flash device 131 is connected with the lens-fitted photo film unit, the forcible discharging switch 134 is turned off.

Figure 12A:
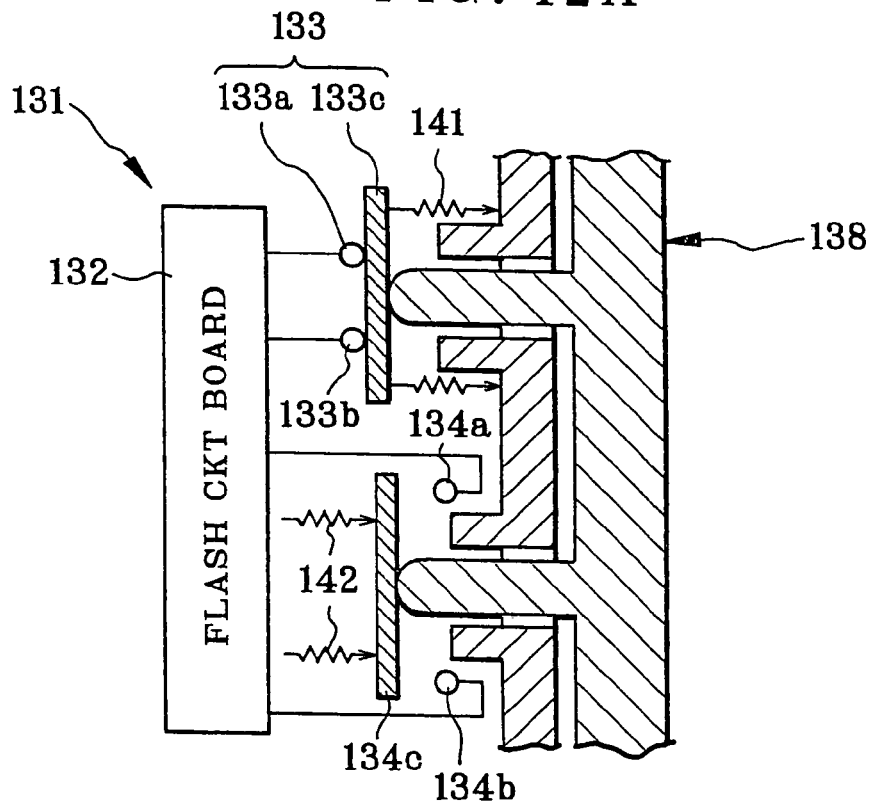
FIG. 12A is a section, partially broken, illustrating the switches and a relevant mechanism.
Figure 12B:
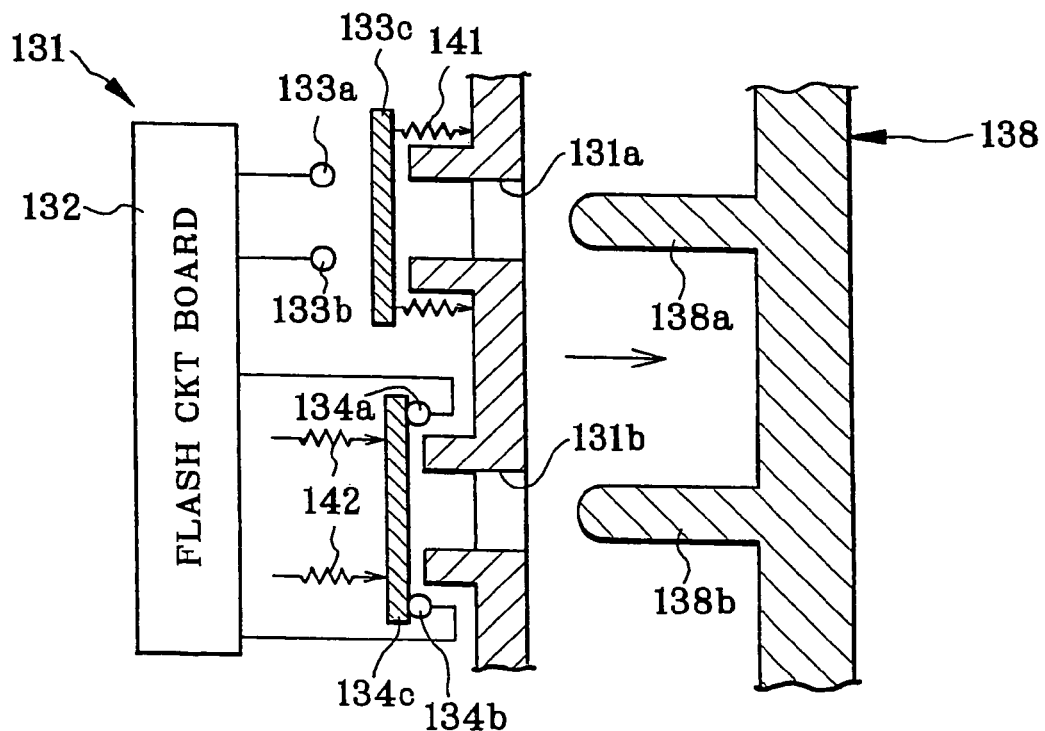
FIG. 12B is a section, partially broken, illustrating the same as FIG. 12A but in a state the flash device is moved away.

In FIGS. 12A and 12B, the charge allowing switch 133 and the forcible discharging switch 134 are illustrated in detail. A lens-fitted photo film unit 138 has a housing from which pressing projections 138a and 138b extend. A flash case of the flash device 131 is provided with insertion holes 131a and 131b for receiving insertion of the pressing projections 138a and 138b. The charge allowing switch 133 is disposed inside the insertion hole 131a. The forcible discharging switch 134 is disposed inside the insertion hole 131b.

The charge allowing switch 133 includes contact points 133a and 133b, and a movable segment 133c for interconnecting the contact points 133a and 133b. The contact points 133a and 133b are connected with the flash circuit board 132. The movable segment 133c is movable between an on position and off position, and when in the on position, contacts both the contact points 133a and 133b, and when in the off position, comes away from the contact points 133a and 133b. Springs 141 bias the movable segment 133c toward the off position.

The forcible discharging switch 134 includes a pair of contact points 134a and 134b and a switch segment 134c for interconnecting the contact points 134a and 134b. The contact points 134a and 134b are connected with the flash circuit board 132. The switch segment 134c is movable between on and off positions, and when in the on position, contacts the contact points 134a and 134b, and when in the off position, comes away from the contact points 134a and 134b. Springs 142 bias the switch segment 134c toward the on position.

In FIG. 12A, the pressing projections 138a and 138b come into the insertion holes 131a and 131b in the connected state of the flash device 131 with the lens-fitted photo film unit 138. The pressing projection 138a pushes the movable segment 133c, and moves the same to the on position against the bias of the springs 141. Therefore, the charge allowing switch 133 is turned on to enable charging. Also, the pressing projection 138b pushes the switch segment 134c, and moves the same to the off position against the springs 142. Thus, the forcible discharging switch 134 is turned off.

When the flash device 131 is removed from the lens-fitted photo film unit 138 as depicted in FIG. 12B, the pressing projections 138a and 138b are disengaged from the insertion holes 131a and 131b. The disengagement of the pressing projection 138a causes the springs 141 to move the movable segment 133c to the off position. The charge allowing switch 133 is opened to disable the charging. The disengagement of the pressing projection 138b causes the springs 142 to move the switch segment 134c to the on position. Thus, the forcible discharging switch 134 is turned on to discharge the main capacitor 45.

Therefore, discharging the main capacitor 45 upon removal of the flash device 131 is effective in preventing a user from feeling electric shock even he or she happens to touch the contact points of the sync switch 43. The removal of the flash device 131 turns off the charge allowing switch 133. So, if the charger switch is turned on, there occurs no restart of the charging. Also, if a user inadvertently fails to turn off the charger switch, there occurs no wasteful use of the dry battery 48.

Figure 13A:
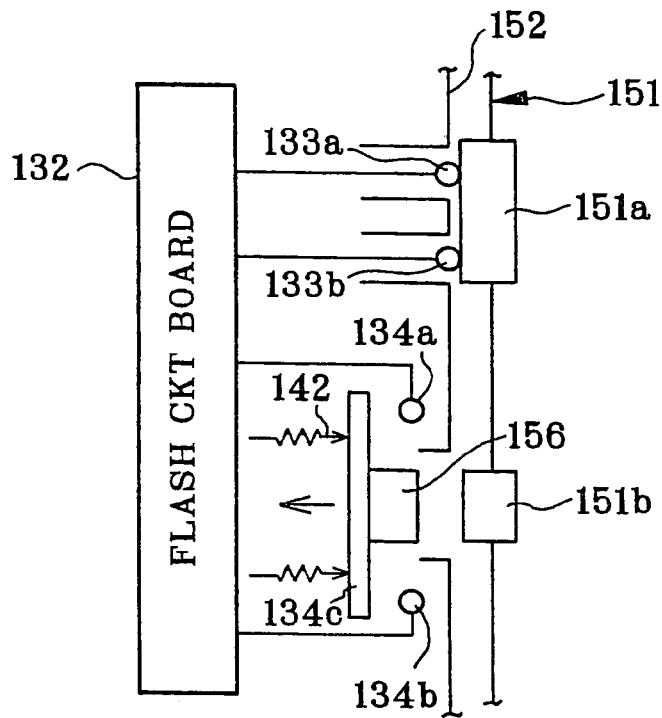
FIG. 13A is an explanatory view in elevation, illustrating another preferred set of switches with which magnets are used.
Figure 13B:
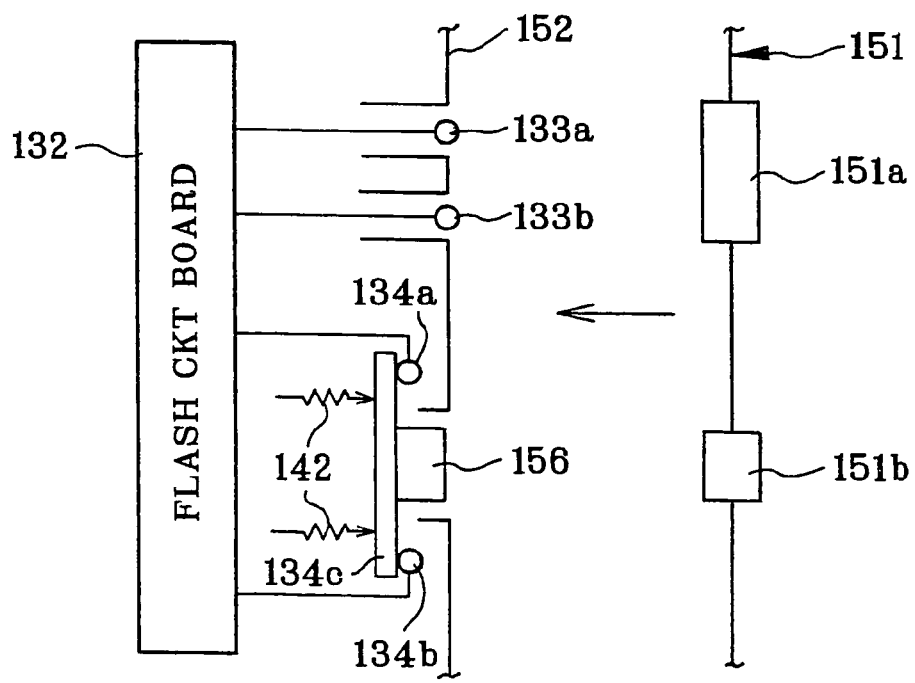
FIG. 13B is an explanatory view in elevation, illustrating the same as FIG. 13A but in a state the flash device is moved away.

It is also possible to use magnets for switching the charge allowing switch 133 and the forcible discharging switch 134. In FIGS. 13A and 13B, another preferred lens-fitted photo film unit 151 has magnets 151a and 151b for holding a flash device 152 by attraction.

When the flash device 152 is connected with the lens-fitted photo film unit 151, the magnet 151a contacts the contact points 133a and 133b of the charge allowing switch 133, to interconnect those. The charge allowing switch 133 is turned on, to enable charging.

A first magnet 156 is fixed on the switch segment 134c of the forcible discharging switch 134. The first magnet 156 and the magnet 151b are so disposed that their poles of the same polarity are opposed to each other. When the flash device 152 is connected, the first magnet 156 repels the magnet 151b. The switch segment 134c moves to the off position against the springs 142, to turn off the forcible discharging switch 134.

When the flash device 152 is removed from the lens-fitted photo film unit 151, the magnet 151a comes away from the contact points 133a and 133b. The charge allowing switch 133 is turned off to disable the charging. As the magnet 151b as second magnet is away from the first magnet 156, the switch segment 134c is caused by the springs 142 to move to the on position, to turn on the forcible discharging switch 134. The main capacitor 45 is discharged.

Note that the magnets 151a, 151b and 156 may be permanent magnets or electromagnets.

Figure 14:
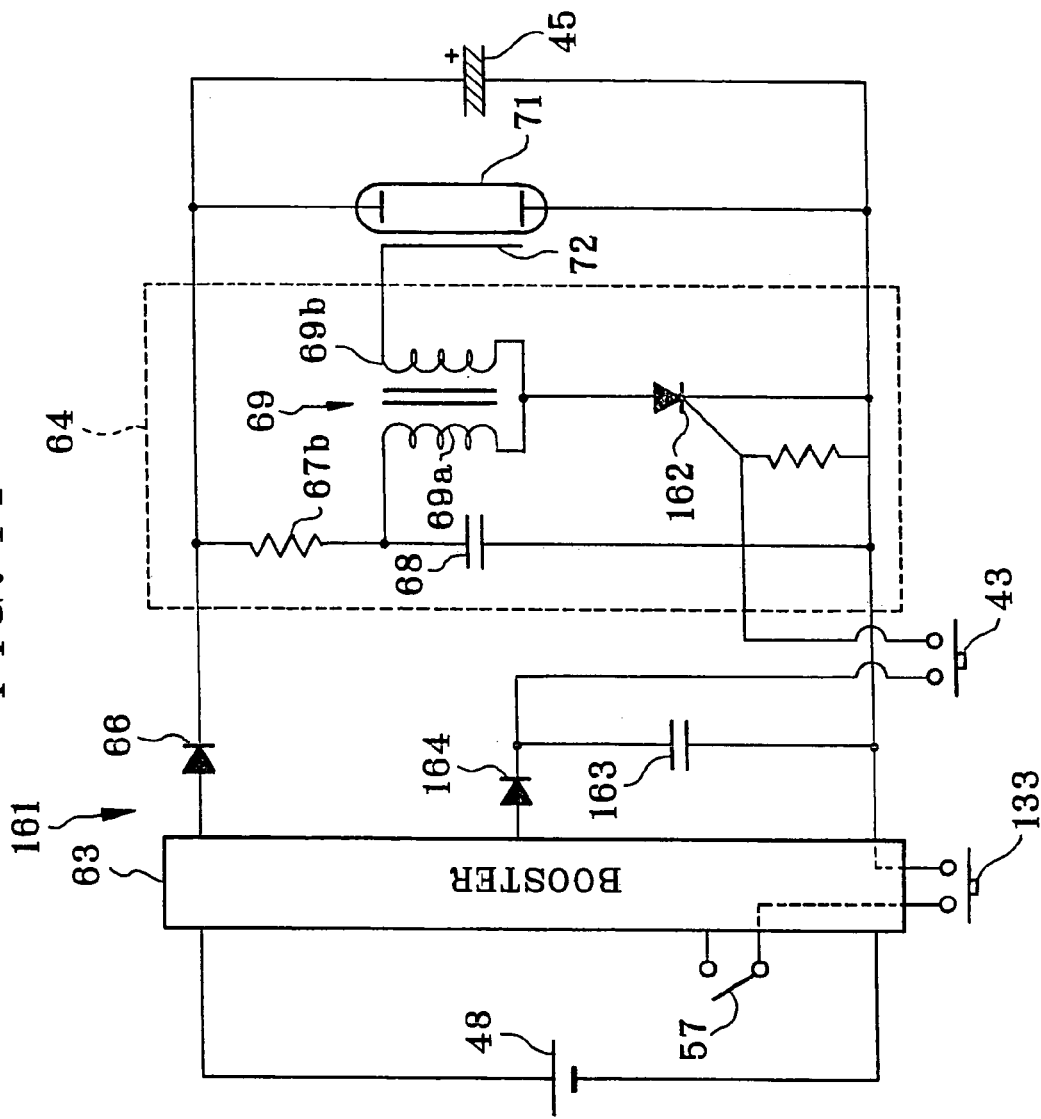
FIG. 14 is a circuit diagram illustrating a flash circuit in which a trigger switching thyristor is associated with a trigger circuit.

A flash circuit board 161 in FIG. 14 is characterized in lowered voltage applied to the contact points for synchronization. A thyristor 162 as trigger switching element is provided in the trigger circuit 64 in the flash circuit board 161. An anode of the thyristor 162 is connected with the common terminal of the trigger transformer 69. A cathode of the thyristor 162 is connected with a negative terminal of the trigger capacitor 68. A gate of the thyristor 162 is connected with one of the contact points of the sync switch 43.

A subsidiary trigger capacitor 163 is connected with a second terminal of the sync switch 43. The subsidiary trigger capacitor 163 stores charge input to a gate terminal of the thyristor 162. The subsidiary trigger capacitor 163 is charged by the booster 63 at the same time as the main capacitor 45 and the trigger capacitor 68. A rectification diode 164 is connected for regulating a direction of a current.

The sync switch 43 is turned on, to discharge the subsidiary trigger capacitor 163, to turn on the thyristor 162. Thus, the trigger capacitor 68 and then the main capacitor 45 are discharged. Flash light is emitted.

The subsidiary trigger capacitor 163 has characteristically low potential even when fully charged, because of its purpose for turning on the thyristor 162. Only the low voltage is applied to the sync switch 43. This is effective in avoiding danger if a person s finger touches the sync switch 43. Also, the use of the charge allowing switch 133 can suppress a restart of the charging after discharging while the flash device is removed.

In the above embodiment, flashlight is emitted always after the flash device is charged. However, object brightness can be measured by a photometric device. The flash emission can be controlled according to the measured object brightness. Also, a flash device may have such an adjustable structure that an amount of flash light can be changed according to the object brightness.

Figure 15:
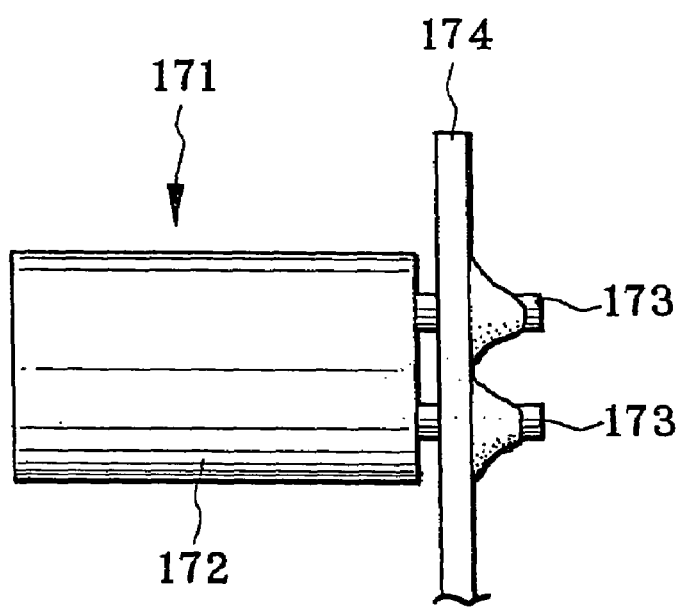
FIG. 15 is a side elevation illustrating another preferred battery that is an electrode pin type.

Another preferred form of battery is depicted in FIG. 15. The battery is an electrode pin type 171. This form is effective in suppressing or preventing unwanted distribution of parts of the flash devices. The battery 171 includes a battery body 172 and a pair of battery electrode pins 173 projecting from the battery body 172. A flash circuit board 174 is connected with the battery 171 by means of the battery electrode pins 173.

The battery 171 is fixed on the flash circuit board 174 by inserting the battery electrode pins 173 in through holes in the flash circuit board 174 and attachment with solder. Therefore, the firmness in keeping the battery 171 is very high on the flash circuit board 174. If the battery 171 is removed with forcible operation, the battery electrode pins 173 are removed together with the battery body 172. This is effective in suppressing the reuse and distribution of the flash circuit board 174 due to the difficulty in exchanging the battery 171. Specifically, the battery 171 can be constructed in a specialized form, so as to prevent users from easy exchange of the battery 171. Thus, the proportion of withdrawal of the flash device can be higher.

The battery electrode pins 173 of the battery 171 are disposed on one end of the battery body 172. This is effective in reducing a length of the battery electrode pins 173 in comparison with the form in which electrodes lie on ends of the battery body. It is possible to fix the battery 171 firmly on the flash circuit board 174 in a manner resistant to detachment. Of course, a battery in which electrodes lie on ends of the battery body may be used in combination with the flash circuit board 174.

Figure 16A:
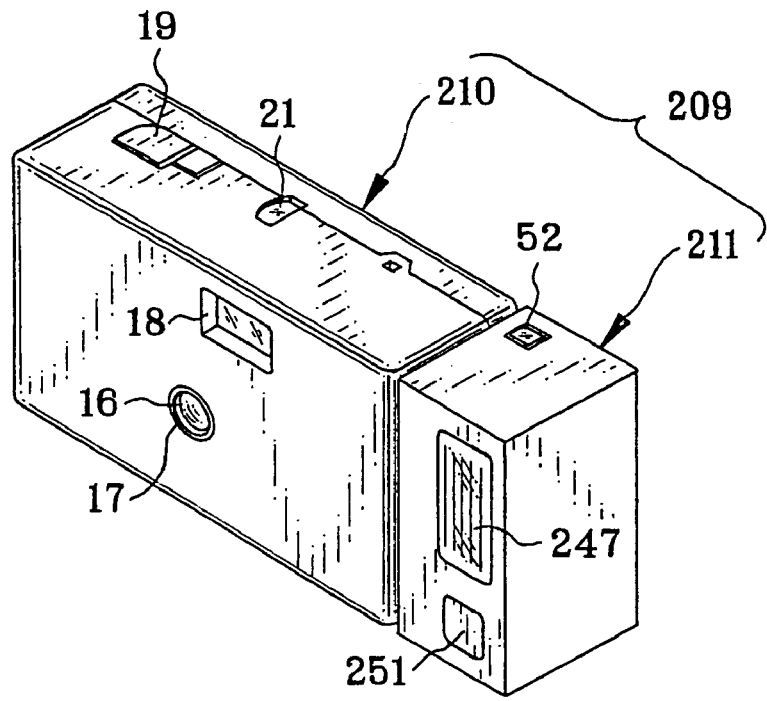
FIG. 16A is a perspective illustrating another preferred lens-fitted photo film unit with which a flash device is electrically connected by four terminals.
Figure 16B:
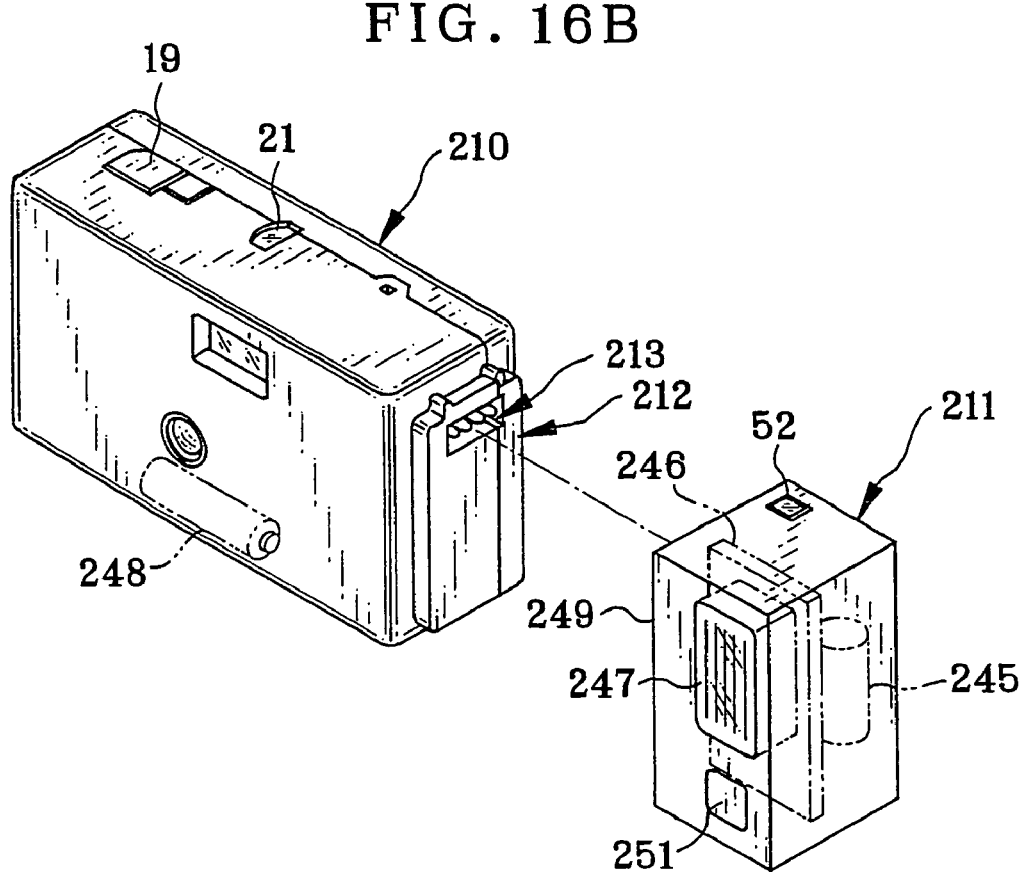
FIG. 16B is an exploded perspective illustrating the same as FIG. 16A.

In FIGS. 16A–20, another preferred embodiment is depicted, in which a flash device is externally connectable, but a battery is contained in a housing of a lens-fitted photo film unit. Elements similar to those of the above embodiments are designated with identical reference numerals. In FIGS. 16A and 16B, a lens-fitted photo film unit 210 is used in combination with a flash device 211. Those constitute a lens-fitted photo film system 209. The lens-fitted photo film unit 210 has a mechanism for taking an exposure and is pre-loaded with photo film. The flash device 211 is an externally connectable type, and is secured to the lens-fitted photo film unit 210 in a removable manner.

The lens-fitted photo film unit 210 is a single-use device in which the photo film is used only for one time. The flash device 211, in contrast, is a repeatedly usable device for plural strips of the photo film, and has a considerably long useful life. A dry battery 248 is accommodated in the lens-fitted photo film unit 210 for supplying the flash device 211 with power.

A user can connect the flash device 211 with an unused lens-fitted photo film unit 210 in place of the lens-fitted photo film unit 210 after the use, and can take photographs with those. It is impossible to exchange the photo film in the lens-fitted photo film unit 210. Capacity of the dry battery 248 is predetermined at a level sufficient for exposures of a single strip of the photo film. Thus, the dry battery 248 can be AAA type, and other types with a considerably small capacity. This can reduce the size of the whole of the lens-fitted photo film unit 210.

Figure 17:
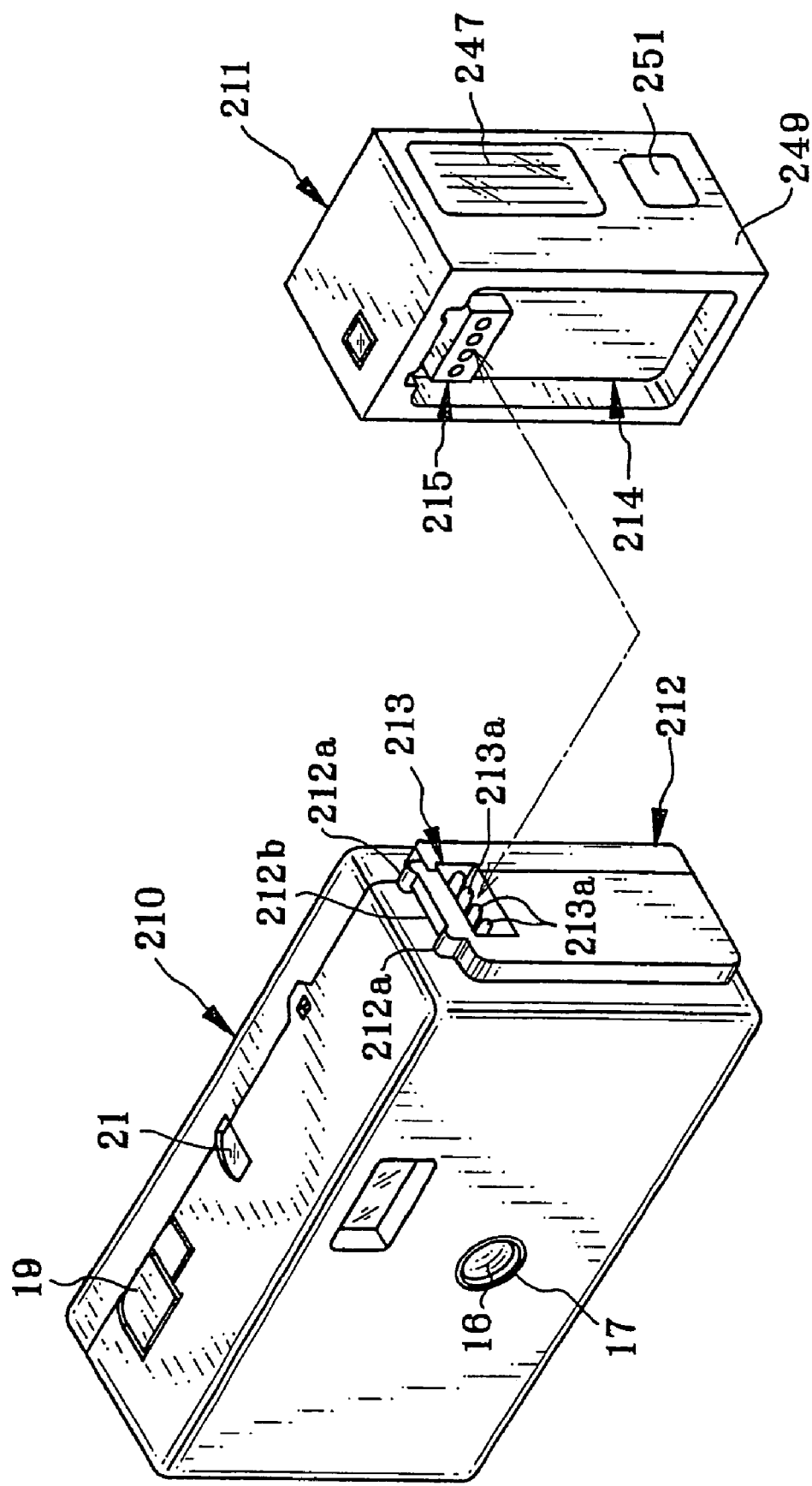
FIG. 17 is an exploded perspective illustrating the same as FIG. 16B but where terminals of the flash device are viewed.
Figure 18:
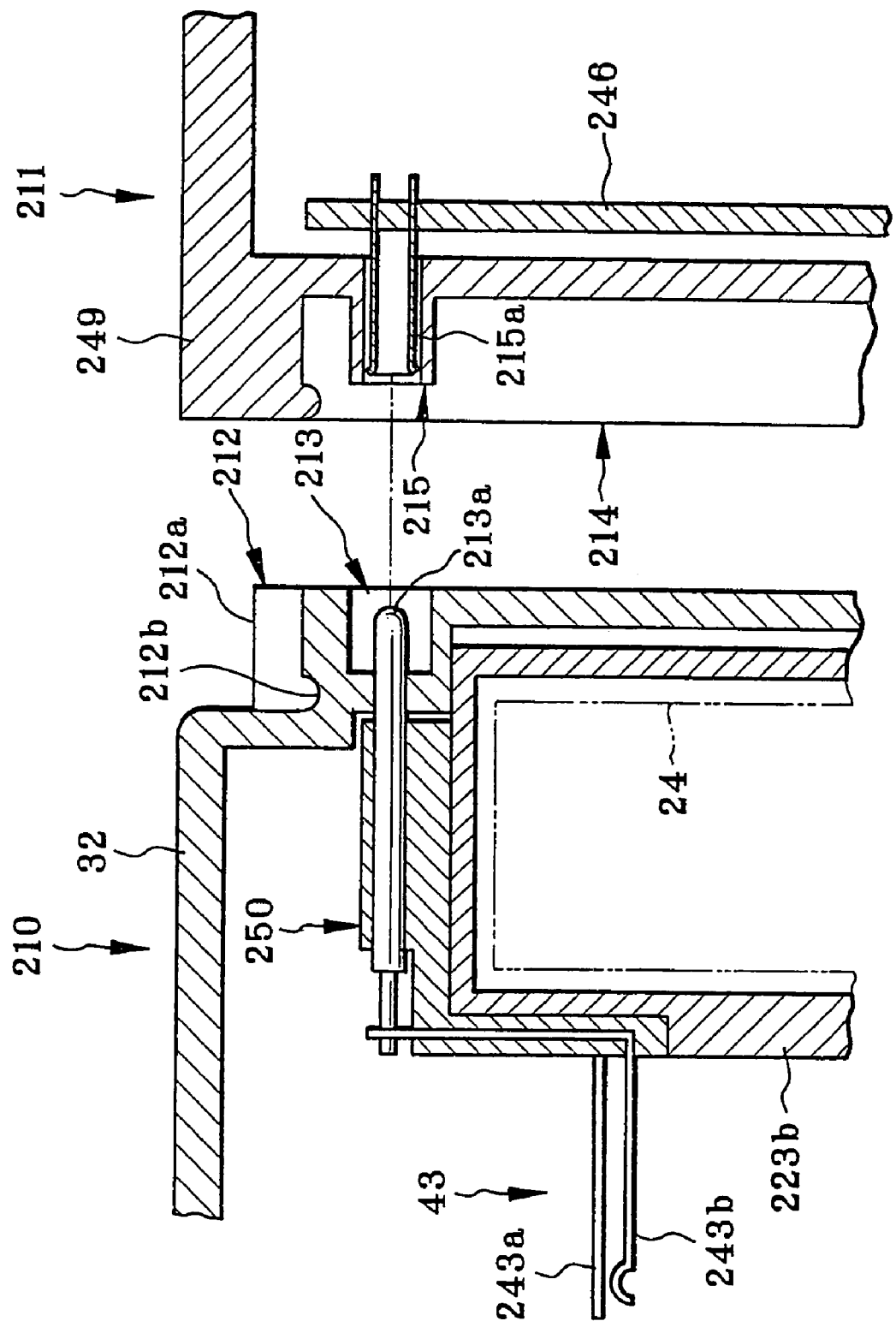
FIG. 18 is a section, partially broken, illustrating the lens-fitted photo film unit of FIG. 17.

In FIGS. 17 and 18, an attachment engaging projection 212 as attaching portion is formed to project from a lateral panel of the lens-fitted photo film unit 210, for connection of the flash device 211 in a removable manner. The attachment engaging projection 212 projects horizontally. Positioning ridges 212a are formed on the top of the attachment engaging projection 212. A retention gap 212b is formed between the positioning ridges 212a for keeping the flash device 211 from dropping accidentally. An output connector 213 is disposed under the positioning ridges 212a for electric connection with the flash device 211.

An engaging recess 214 as engaging portion is formed in the flash device 211 for engagement with the attachment engaging projection 212. The engaging recess 214 retreats in association with the shape of the attachment engaging projection 212. An inner surface of the engaging recess 214 is formed for engagement with the positioning ridges 212a and the retention gap 212b. An input connector 215 is disposed in the engaging recess 214 for connection with the output connector 213. The flash device 211 is attached to the lens-fitted photo film unit 210 by retaining the attachment engaging projection 212 with the engaging recess 214.

Four male terminals 213a as first and second connection terminals are included in the output connector 213. Two of the male terminals 213a are a pair used with a sync switch. The remaining two of the male terminals 213a are a pair used for supply of power. Four female terminals 215a as powering terminals and trigger terminals are included in the input connector 215, and connectable with the male terminals 213a. The female terminals 215a are shaped to receive insertion of the male terminals. The flash device 211 is supplied with power, and also receives a trigger signal, both through the output connector 213 and the input connector 215.

It is to be noted that the shapes of the attachment engaging projection 212, the engaging recess 214, the output connector 213, the input connector 215, the male terminals 213a and the female terminals 215a are not limited to those described above, but can be any suitable one of various forms.

Figure 19:
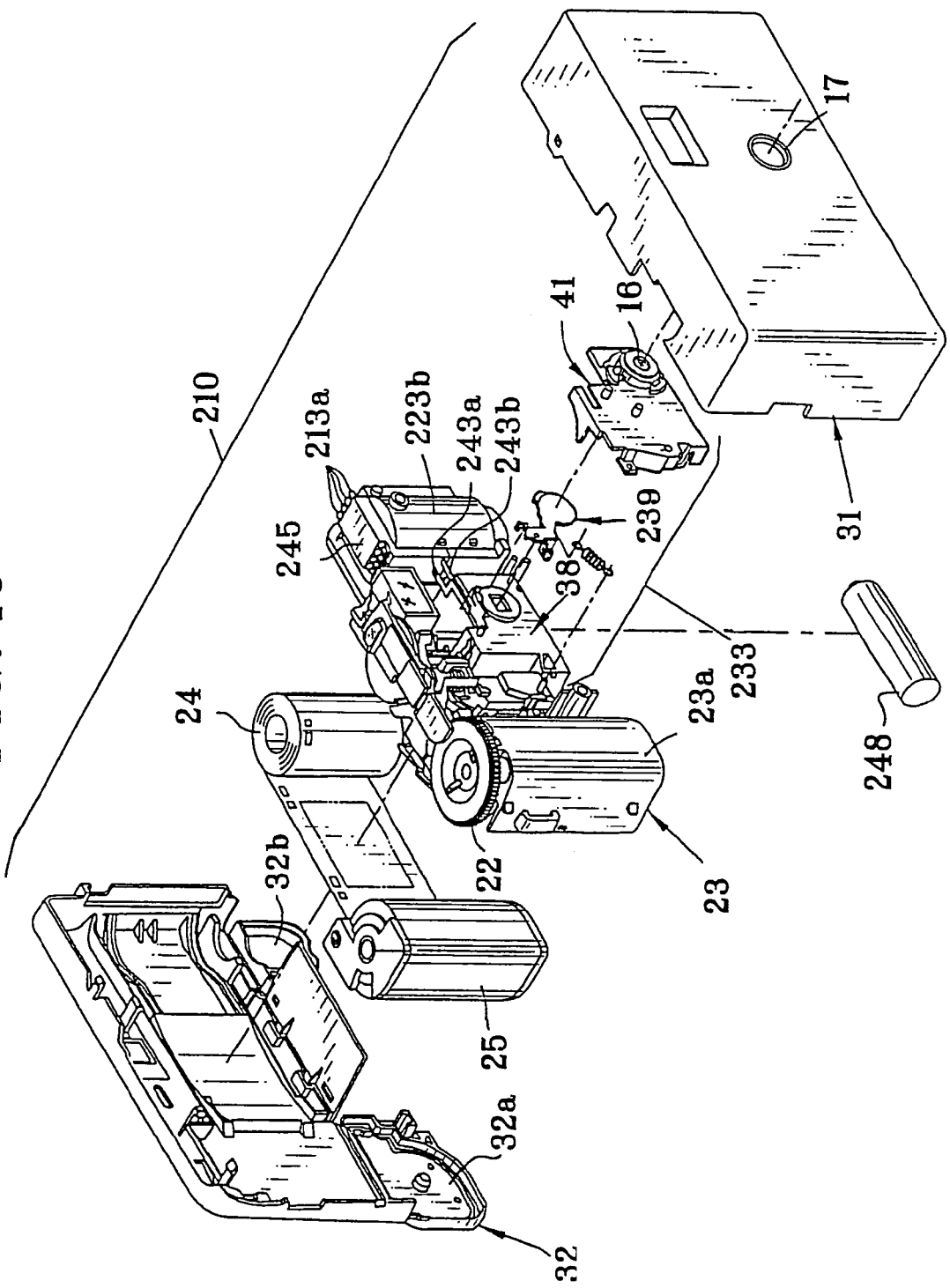
FIG. 19 is an exploded perspective illustrating the lens-fitted photo film unit of FIG. 17.
Figure 20:
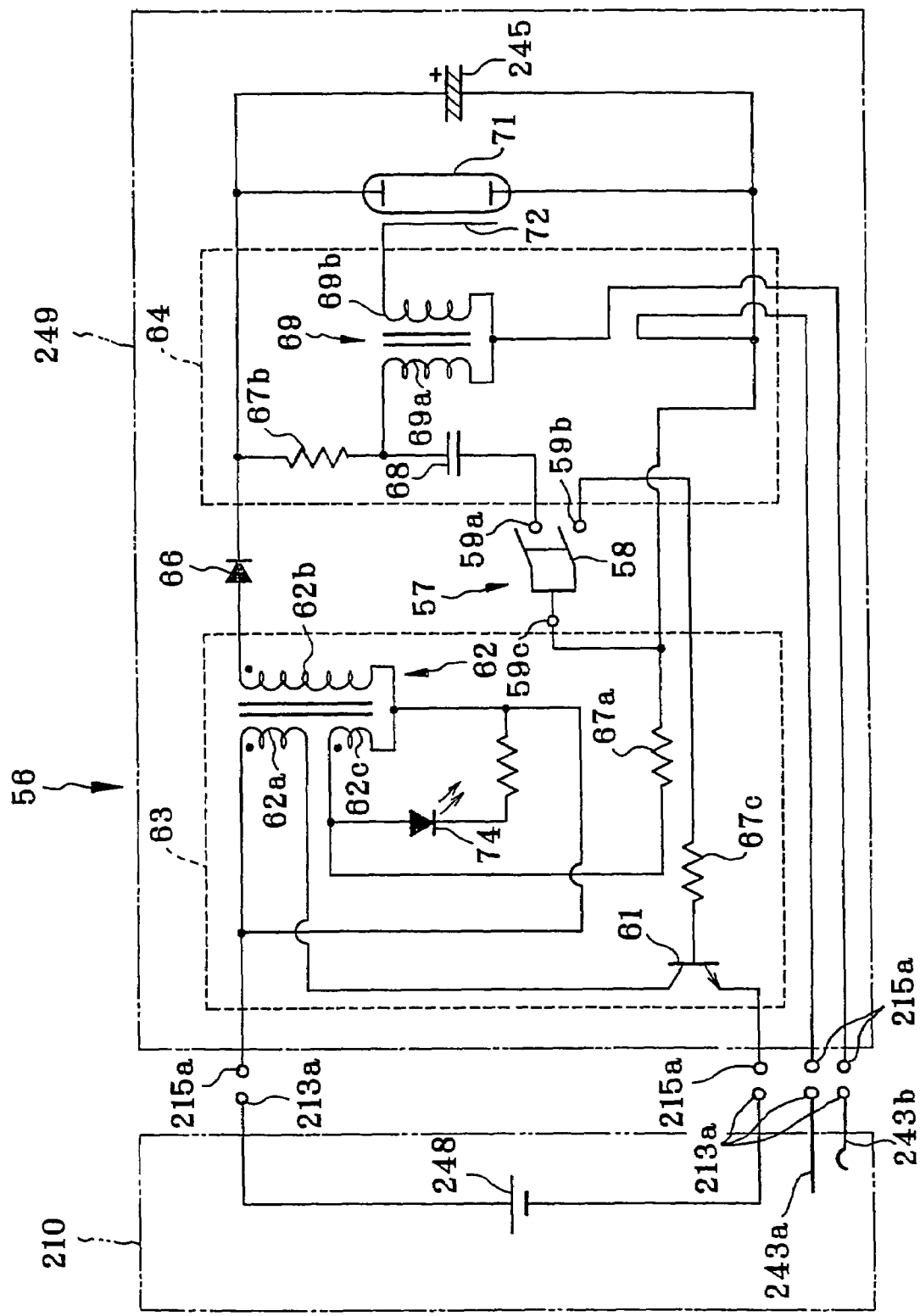
FIG. 20 is a circuit diagram illustrating circuits in the lens-fitted photo film unit of FIG. 17.

In FIG. 19, a pair of sync switch segments 243a and 243b have first ends which are disposed near to a shutter blade 239. A terminal holder 250 supports second ends of the sync switch segments 243a and 243b. To be precise, the male terminals 213a are supported by the terminal holder 250 inclusive of the sync switch segments 243a and 243b. As a method of fixation, an in-mold forming is used to attach the sync switch segments 243a and 243b to the terminal holder 250. A roll holder chamber 223b has an upper face where the terminal holder 250 is secured.

The dry battery 248 is disposed under an exposure unit 233. Contact segments of metal (not shown) are disposed under the exposure unit 233 for contact with electrodes of the dry battery 248. The contact segments are connected with the male terminals 213a.

The flash device 211 is constituted by a flash circuit board 246, a flash emitter 247 and a flash case 249. The flash circuit board 246 has a circuit pattern printed on a substrate, and includes various circuit elements in which a main capacitor 245 is included. The flash emitter 247 has a xenon discharge tube, a reflector, a diffusing plate and the like. The flash case 249 contains any of those elements. For those parts to be assembled in the flash device 211, parts with better performance and higher durability than those of a flash built-in type of lens-fitted photo film unit known in the prior art are used. A manufacturing cost of the flash device 211 is relatively higher. An expense of a user buying the flash device 211 may be high. However, the flash device 211 can be used for many times. A cost paid for the use can be lower in consideration of expense per one time of flashing.

A diffusing plate for the flash emitter 247 appears in the front panel of the flash case 249. A charger button 251 is disposed under the diffusing plate. A rear of the charger button 251 contacts a charger switch included in a flash circuit. Only while the charger button 251 is depressed, an operation of charging is continued. This is advantageous in that no operation of turning off is required. No wasteful use of the dry battery 248 occurs. Note that a charger button of a latch type may be used, and kept positioned in the on state. Also, a sliding type of operation member may be used in place of the pushbutton.

The lens-fitted photo film unit 210 does not contain an expensive flash device. Used sets of the lens-fitted photo film unit 210 are prevented from distribution to reloading dealers, part-reusing dealers or the like in the market. The proportion of genuine withdrawal of the lens-fitted photo film unit 210 at the original camera manufacturer can be higher. Therefore, the resources can be utilized effectively by reducing the abandonment. Environmental pollution can be prevented.

In the above embodiment, the male terminals 213a and the female terminals 215a are used for connecting the flash device 211 with the lens-fitted photo film unit 210. However, each of the two sets of the terminals may include three terminals. The three may include a powering terminal, a trigger terminal and a common terminal for both of powering and triggering.

In the above embodiment, the dry battery 248 is used as a power source for driving the flash device 211. However, the dry battery 248 may be used for supplying power to an aperture stop changing mechanism, which may be incorporated in the lens-fitted photo film unit 210 for changing over an aperture stop according to measured object brightness.

Figure 21A:
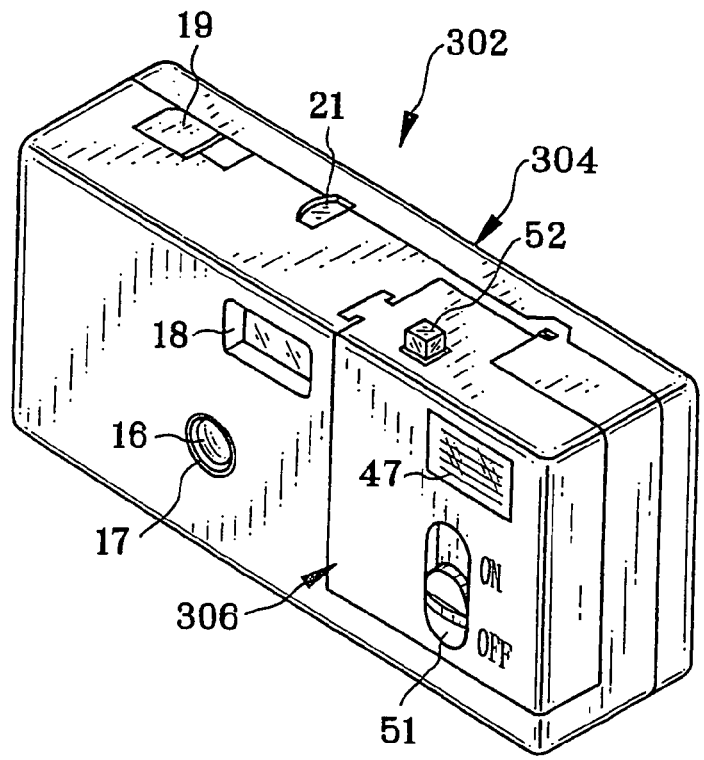
FIG. 21A is a perspective illustrating a lens-fitted photo film unit with which a unit of a flash device is connected.
Figure 21B:
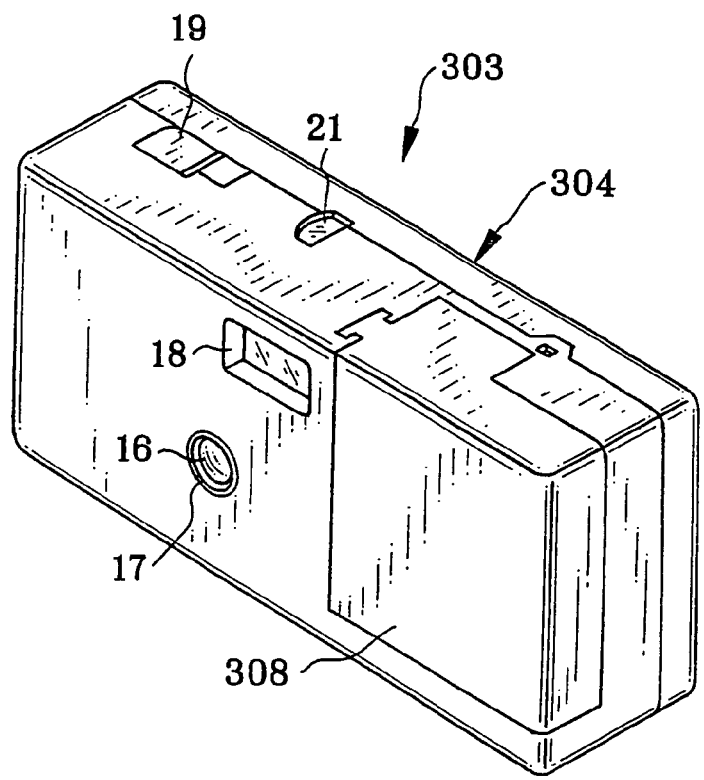
FIG. 21B is a perspective illustrating a lens-fitted photo film unit with which a dummy block is attached.
Figure 22:
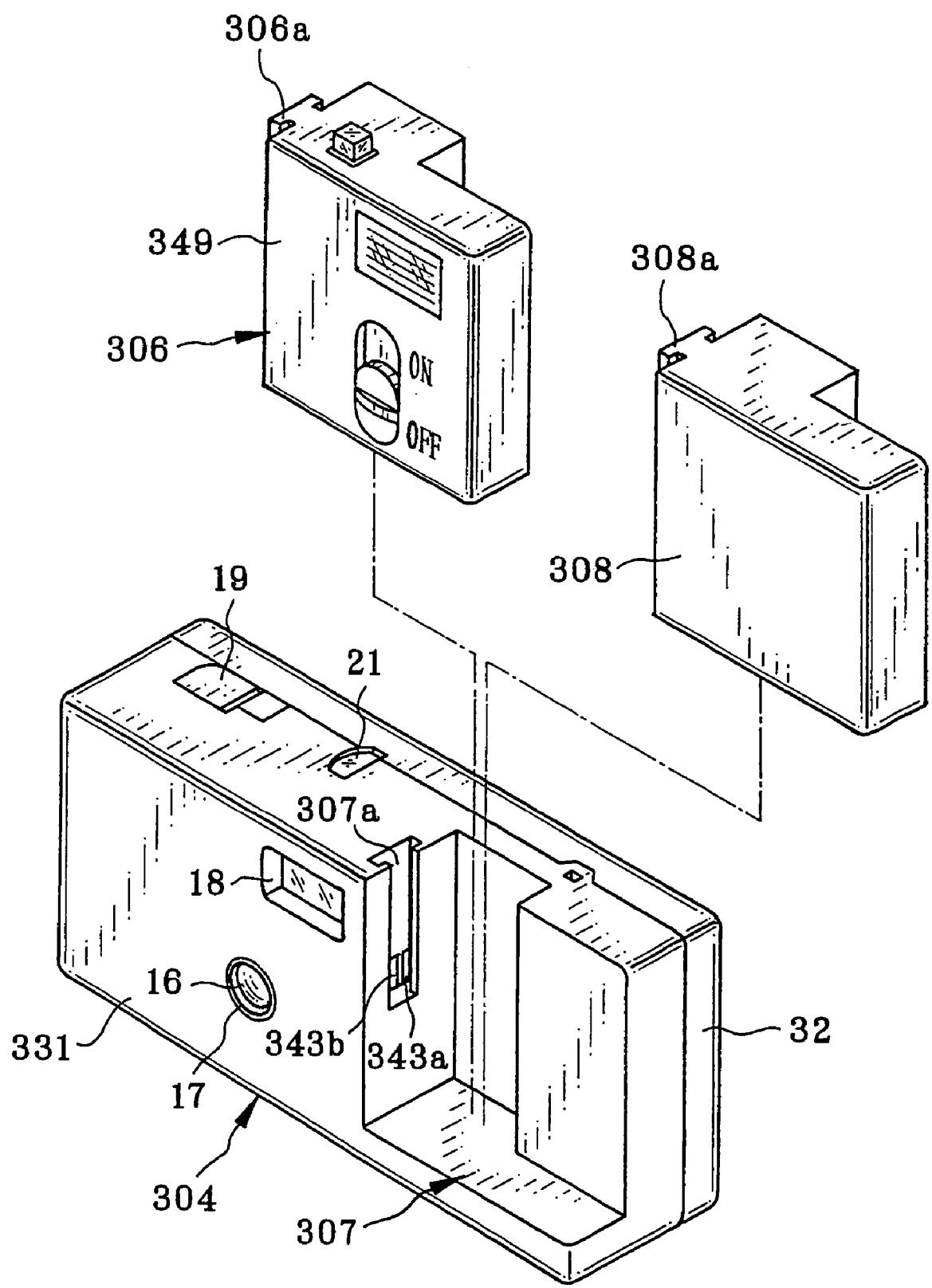
FIG. 22 is an exploded perspective illustrating the same as FIGS. 21A and 21B in a state of exchanging the flash device and the dummy block.
Figure 23:
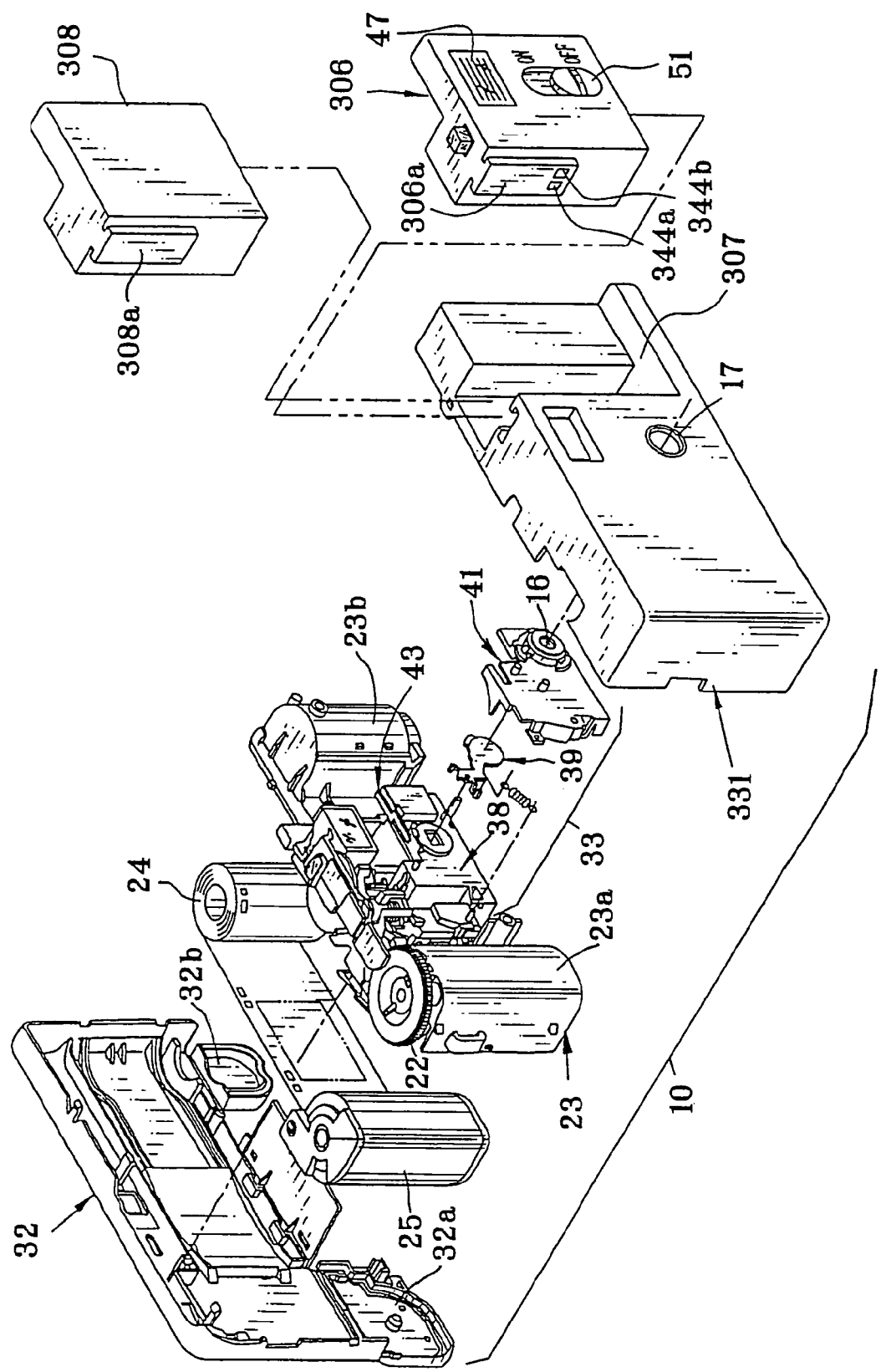
FIG. 23 is an exploded perspective illustrating the same as FIG. 22.

In FIGS. 21A–24, still another preferred embodiment is illustrated, in which one housing can be used for two types of lens-fitted photo film units. Elements similar to those of the above embodiments are designated with identical reference numerals. In FIGS. 21A, 21B and 22, a lens-fitted photo film unit 302 of a flash type includes a housing 304, which is commonly usable as an element in a lens-fitted photo film unit 303 of a daylight type. The housing 304 has a mechanism for taking an exposure and is pre-loaded with photo film. An attaching recess 307 as attaching portion or containing gap is formed in the housing 304. A flash device 306 of an externally connectable type is secured to the attaching recess 307 in a removable manner.

When the flash device 306 is retained in the attaching recess 307, the lens-fitted photo film unit 302 of the flash type is obtained. A dummy block 308 or dummy cover can be attached also to the attaching recess 307 in place of the flash device 306. The dummy block 308 is a cover for covering the attaching recess 307 at the time of not using the flash device 306. The lens-fitted photo film unit 303 of the daylight type is obtained when the dummy block 308 is attached. The housing 304 for the lens-fitted photo film units 302 and 303 is utilized as a common element. This is effective in raising efficiency in the production in a factory.

Figure 24:
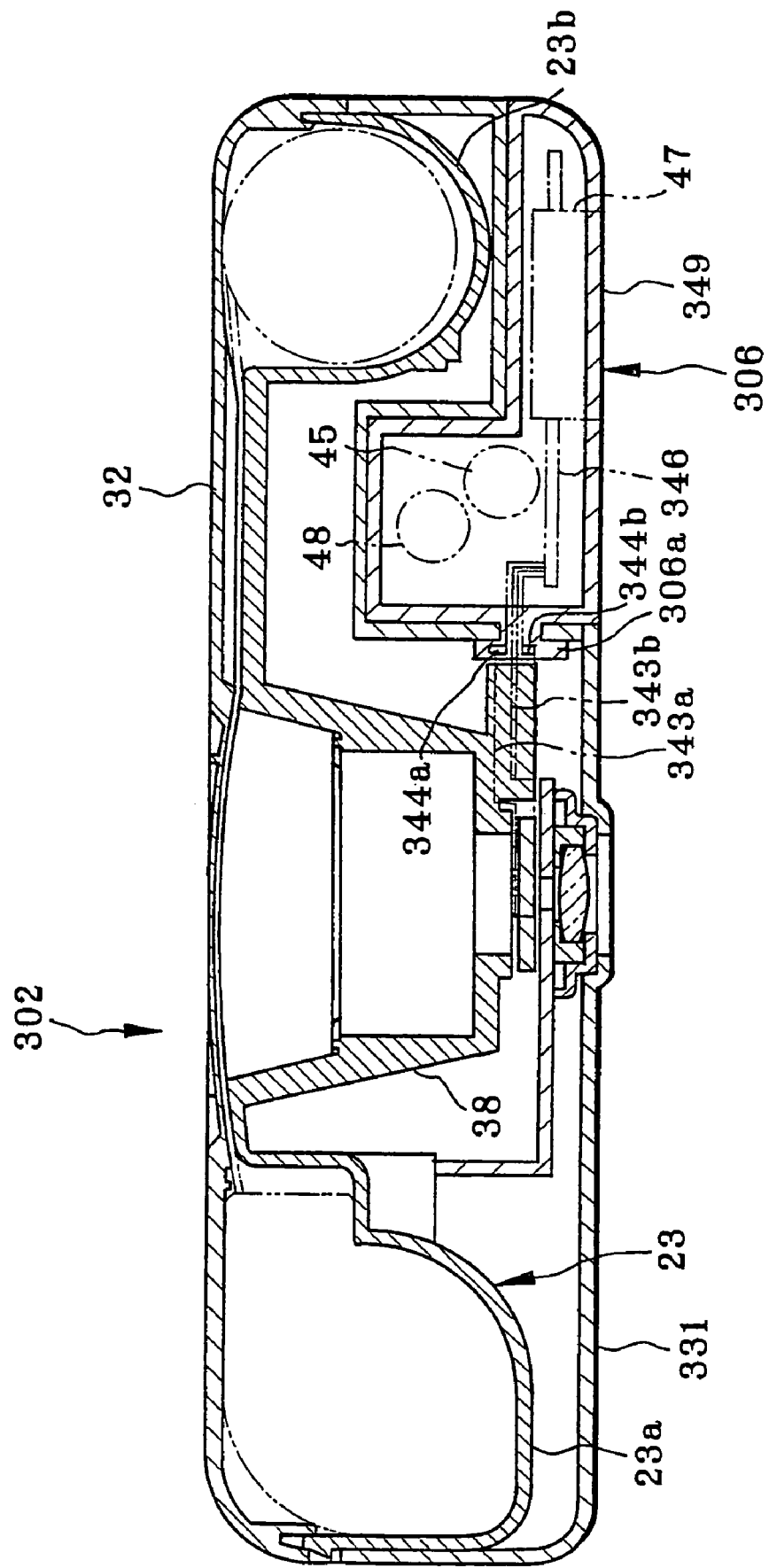
FIG. 24 is a horizontal section illustrating the lens-fitted photo film unit of FIG. 21A.

In FIG. 24, the lens-fitted photo film unit 302 is viewed in a horizontal section. The attaching recess 307 is formed by recessing a portion of a front cover 331 as outer cover. An engaging groove 307a is formed in a wall of the attaching recess 307. An engaging portion 306a of the flash device 306 and an engaging portion 308a of the dummy block 308 are engaged with the attaching recess 307. Switch segments 343a and 343b of metal are partially located inside the engaging groove 307a. Contact points 344a and 344b appear on the outside of the engaging portion 306a of the flash device 306 for connection with the switch segments 343a and 343b. When the engaging portion 306a is engaged with the engaging groove 307a, the switch segments 343a and 343b come in contact with respectively the contact points 344a and 344b.

A flash case 349 is included in the flash device 306, and constitutes a portion of an outer surface of the lens-fitted photo film unit 302 together with the front cover 331. Namely, a portion of the flash case 349 appears outside the lens-fitted photo film unit 302 in a manner flush with the front cover 331.

The dummy block 308 is formed in an approximately equal shape to the flash case 349 of the flash device 306. According to this, a peripheral contour of the lens-fitted photo film unit 302 of the flash type can be determined approximately the same as a peripheral contour of the lens-fitted photo film unit 303 of the daylight type. Packaging material such as a gusseted bag for packaging the lens-fitted photo film units 302 and 303 can be commonly prepared. This is advantageous in keeping high efficiency in production, as the number of the types of packaging materials can be reduced.

A peripheral contour of the flash case 349 is approximately the same as a peripheral contour of the dummy block 308. To produce those, it is possible to use molds which are partially the same. Although molds in general are very expensive in the manufacturing cost, the common portions in the molds for the flash case 349 and the dummy block 308 make it possible to lower the cost. Also, a shape or design of a contour or appearance can be commonly created between the lens-fitted photo film unit 302 of the flash type and the lens-fitted photo film unit 303 of the daylight type. The number of the shapes or designs to be produced is reduced. This can reduce the cost in development of goods to be shipped to the market.

Figure 25:
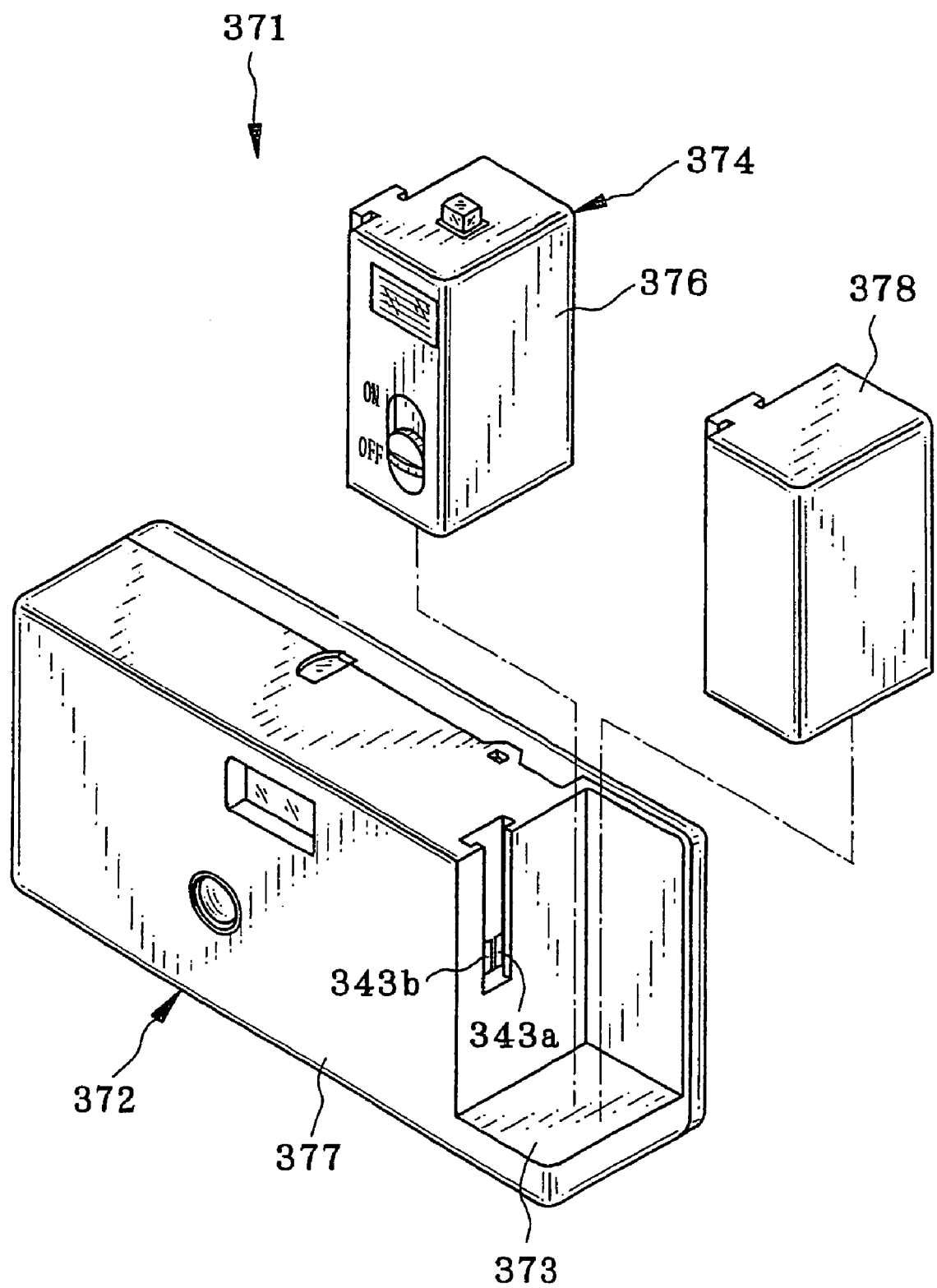
FIG. 25 is an exploded perspective illustrating another preferred lens-fitted photo film unit in which a flash device and a dummy block are box-shaped.
Figure 26:
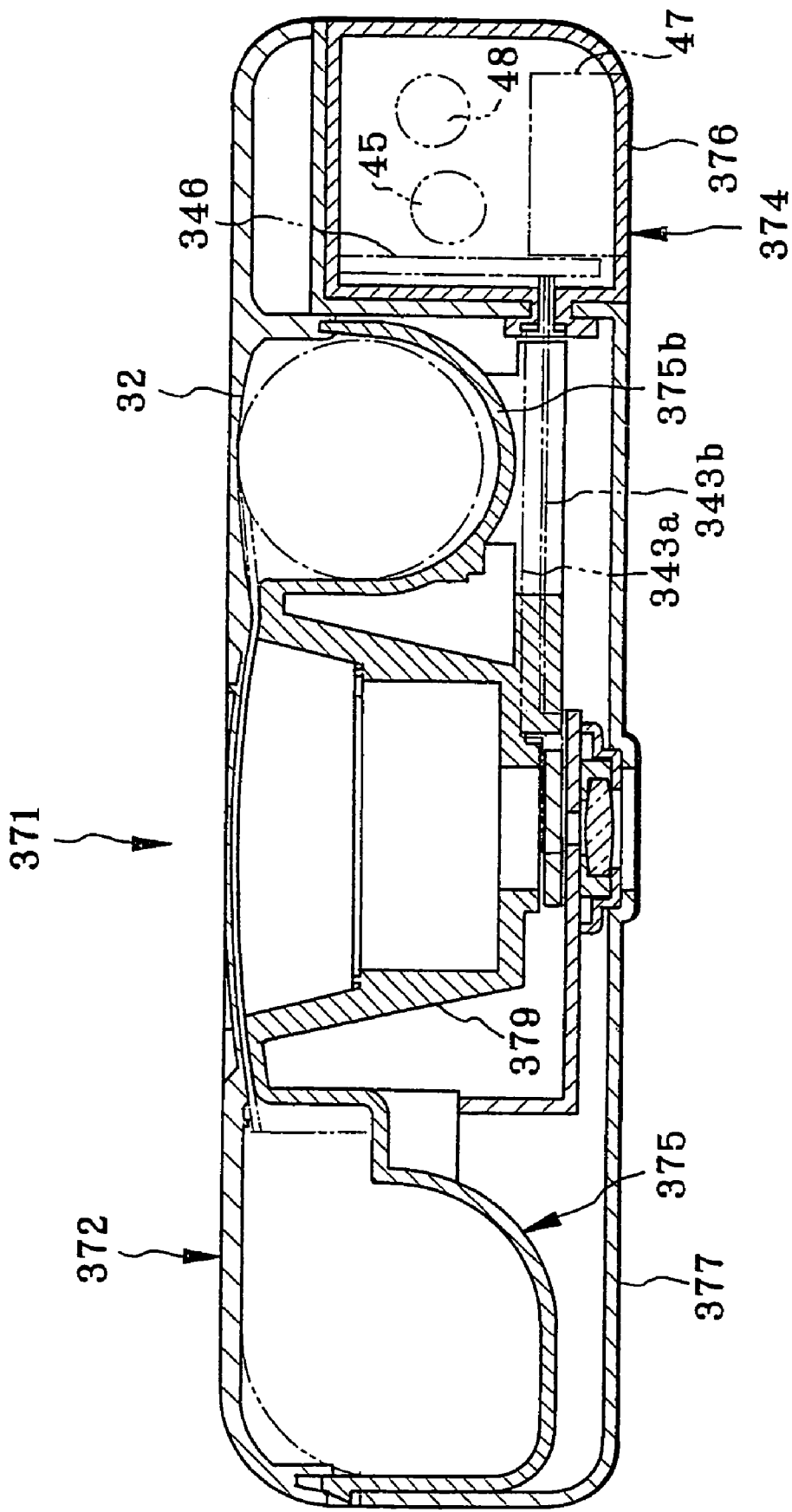
FIG. 26 is a horizontal section illustrating the lens-fitted photo film unit of FIG. 25.

In FIGS. 25 and 26, another preferred lens-fitted photo film unit 371 is illustrated, in which an attaching recess 373 as attaching portion or containing gap is formed in a lateral portion of a housing 372. A flash device 374 has a flash case 376, which is shaped to constitute a greater part of the lateral portion of the lens-fitted photo film unit 371. A front cover 377 as outer cover includes the attaching recess 373. There is a dummy block 378 used when the flash device 374 is not used. The dummy block 378 covers the attaching recess 373. The dummy block 378 has a shape approximately the same as that of the flash device 374.

To locate the attaching recess 373 on a lateral end of the housing 372, a roll holder chamber 375b of a housing 375 is located rather close to a light-shielded tunnel 379. The flash device 374 is disposed beside the roll holder chamber 375b. Therefore, it is possible to reduce a front-to-back thickness of the lens-fitted photo film unit 371. Also, a flash circuit board 346 in the flash case 376 may be disposed in parallel with a lateral face of the flash case 376. This can reduce a width of the flash device 374, and can suppress enlargement in the width of the lens-fitted photo film unit 371.

Figures 27A, 27B:
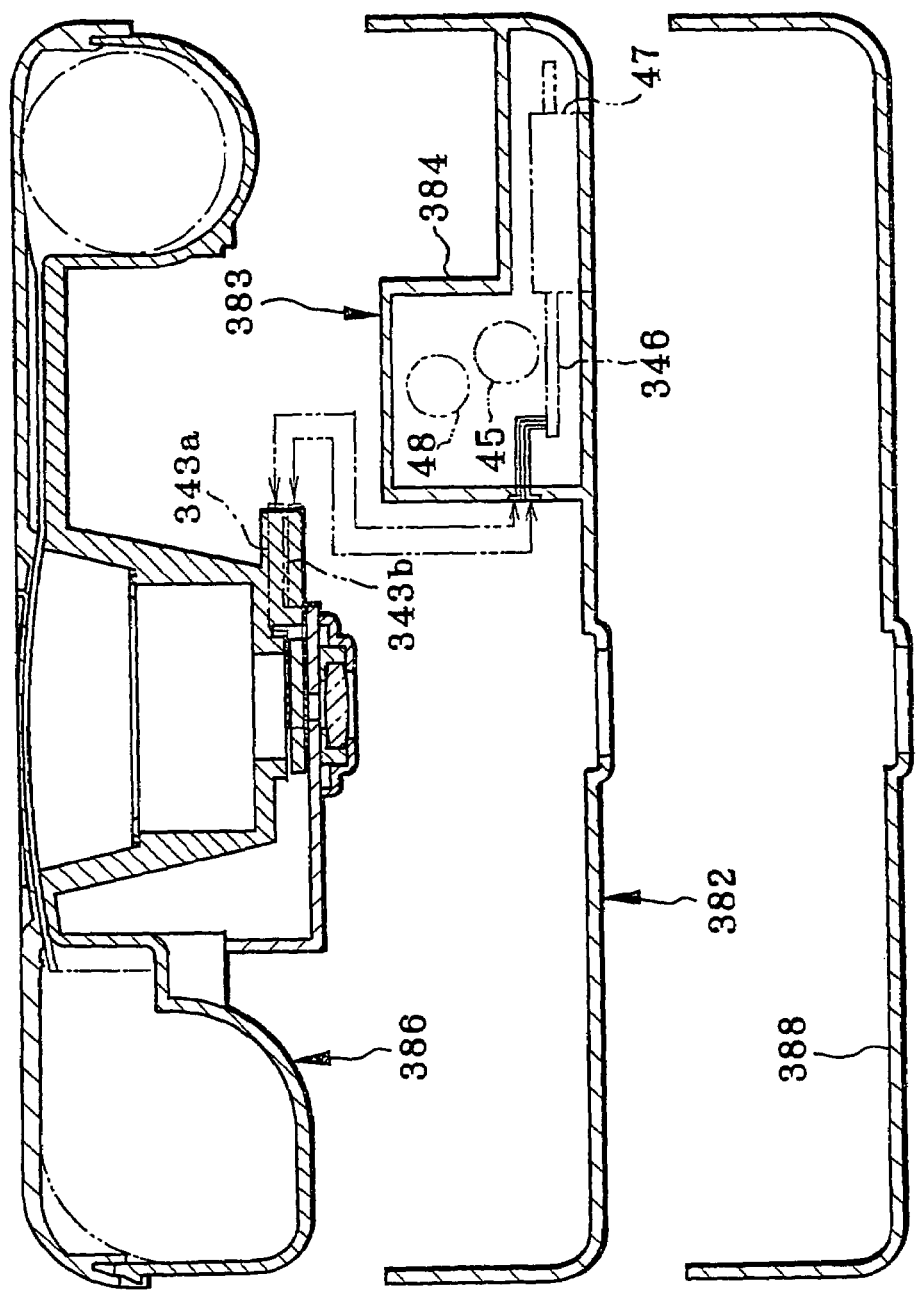
FIG. 27A is a horizontal section illustrating another preferred embodiment having a flash case formed with a front cover.
FIG. 27B is a horizontal section illustrating a dummy front cover instead of the flash-formed front cover.

In the above embodiments, a selected one of the flash device 306, 374 and the dummy block 308, 378 is fitted on the front cover 331, 377. In FIGS. 27A and 27B, another preferred lens-fitted photo film unit 381 is depicted. A flash case 384 of a flash device 383 is formed with a front cover 382 as a portion of a single piece. For the structure of the flash type, a front of a housing 386 is utilized as a portion for attachment. For the structure of the daylight type without the flash device 383, a front cover 388 as outer cover is secured to the housing 386 in a simple shape without the flash case 384. According to this, a peripheral contour of the flash type can be approximately the same as a peripheral contour of the daylight type, because the front of the housing 386 is totally covered inside.

In the embodiment illustrated in FIGS. 8A–10, durability of the parts of the flash device is relatively low by selection of the material. This is effective in lowering the manufacturing cost because of a short useful life. In other words, the time of the useful life elapses while there remains residual capacity in the battery. In contrast, according to all the remaining embodiments, the battery is determined to have a small capacity to lower the manufacturing cost. In other words, the residual capacity of the battery comes down to zero in the course of repeated flash emission before lapse of the useful time of the parts.

However, the features of the embodiment in FIGS. 8A–10, namely the residue display panel 112, the counter/controller 116 and the disabling transistor 119, may be combined in the other embodiments. Thus, it is possible to produce parts with lower durability in combination of a battery with sufficient capacity equal to that of a widely used battery. This is effective in lowering the manufacturing cost.

Although the present invention has been fully described by way of the preferred embodiments thereof with reference to the accompanying drawings, various changes and modifications will be apparent to those having skill in this field. Therefore, unless otherwise these changes and modifications depart from the scope of the present invention, they should be construed as included therein.

The invention claimed is:

1. A lens-fitted photo film unit comprising:
a housing pre-loaded with unexposed photo film;
a flash device for emitting flash light; and
an attaching portion disposed on said housing, and adapted to securing of said flash device in a removable manner, said attaching portion being used for securing a dummy block in producing a type of said lens-fitted photo film unit lacking said flash device, wherein a peripheral contour of the flash device is approximately the same as a peripheral contour of the dummy block;
wherein said flash device includes:
a flash emitter having a flash discharge tube;
a flash circuit board for causing said flash discharge tube to illuminate in synchronism with an exposing operation;
a battery for supplying said flash circuit board with power; and
a tightly closed flash case for containing said flash emitter, said flash circuit board, and said battery.

2. A lens-fitted photo film unit as defined in claim 1, wherein said housing includes:
a main body pre-loaded with said unexposed photo film;
a front cover secured to a front of said main body;
a rear cover secured to a rear of said main body;
a recess, formed in said front cover to constitute said attaching portion, the recess being sized to accommodate a selected one of said flash device and said dummy block.

3. A lens-fitted photo film unit as defined in claim 2, wherein an outer surface of both said flash device and said dummy block lies in an extension of a surface of said front cover.

4. A lens-fitted photo film unit as defined in claim 3, wherein said recess and said flash device are L-shaped as viewed downwards.

5. A lens-fitted photo film unit as defined in claim 3, wherein said recess and said flash device are substantially box-shaped.

6. A system for selectively producing a lens-fitted photo film unit either with or without a flash capability, the system comprising:
a housing pre-loaded with unexposed photo film, the housing having a first type of attachment element disposed thereon;
a flash device capable of emitting flash light, the flash device having a second type of attachment element configured to allow the housing and flash device to be secured to one another;
a dummy block having a peripheral contour that is approximately the same as a peripheral contour of the flash device, the dummy block having the second type of attachment element;
wherein the lens-fitted photo film unit can be assembled so as to have flash capability by attaching the flash device to the housing without the dummy block, and the lens-fitted photo film unit can be assembled so as not to have flash capability by attaching the dummy block to the housing instead of the flash device;
wherein the first type of attachment element comprises electrical contacts that allow for control of the flash device.

* * * * *